United States Patent [19]

Miki et al.

[11] 4,393,467

[45] Jul. 12, 1983

[54] LOCKUP CONTROLLING SYSTEM FOR VARIABLE SPEED, AUTOMATIC TRANSMISSION

[75] Inventors: Nobuaki Miki; Mutsumi Kawamoto, both of Nagoya; Kazuhiko Shibata, Anjyo; Tsuyoshi Yoshida, Toyota; Hiroyuki Amano, Chiryu, all of Japan

[73] Assignees: Aisin-Warner Kabushiki Kaisha; Aisin Seiki Kabushiki Kaisha, both of Japan

[21] Appl. No.: 181,537

[22] Filed: Aug. 26, 1980

[30] Foreign Application Priority Data

Sep. 1, 1979 [JP] Japan .................. 54-111927
Sep. 1, 1979 [JP] Japan .................. 54-111928
Sep. 1, 1979 [JP] Japan .................. 54-111929

[51] Int. Cl.³ .................. G06F 15/20; B60K 41/08
[52] U.S. Cl. .................. 364/424.1; 74/866
[58] Field of Search .................. 364/424.1; 74/866

[56] References Cited

U.S. PATENT DOCUMENTS

| | | | |
|---|---|---|---|
| 4,155,277 | 5/1979 | Minami et al. | 74/866 |
| 4,262,335 | 4/1981 | Ahlen et al. | 364/424.1 |
| 4,290,324 | 9/1981 | Aubert et al. | 74/866 |
| 4,324,153 | 4/1982 | Sugimoto et al. | 74/866 |
| 4,324,322 | 4/1982 | Sibeud | 74/866 X |
| 4,335,428 | 6/1982 | Miki et al. | 364/424.1 |

*Primary Examiner*—Felix D. Gruber
*Attorney, Agent, or Firm*—Sughrue, Mion, Zinn, Macpeak and Seas

[57] ABSTRACT

An electronic control system is provided which controls the locking and unlocking of a variable speed automatic transmission. A hydraulic control circuit comprising a plurality of hydraulic pressure controlling valves, a plurality of flow path switching means and a plurality of solenoid valves is provided to control the engagement of the clutches and brakes of the automatic transmission. The electronic control system detects a slope, modifies a portion of standard data in a manner corresponding to the detected slope to produce shift reference data which is then written into a read-write memory, compares the actual speed stage, throttle opening and vehicle speed against the shift reference data to determine the speed stage to which the transmission is to be shifted and controls the energization of the solenoid valves to change or shift the speed stage. Additionally, the electronic control system reads the minimum vehicle speed required to establish lockup and the maximum vehicle speed for unlocking which correspond to the actual speed stage and the throttle opening from lockup controlling reference data, compares them against the actual vehicle speed to determine the necessity of lockup or unlocking and controls the energization of the solenoid valves in accordance with the determination to establish a lockup or an unlocked condition.

33 Claims, 47 Drawing Figures

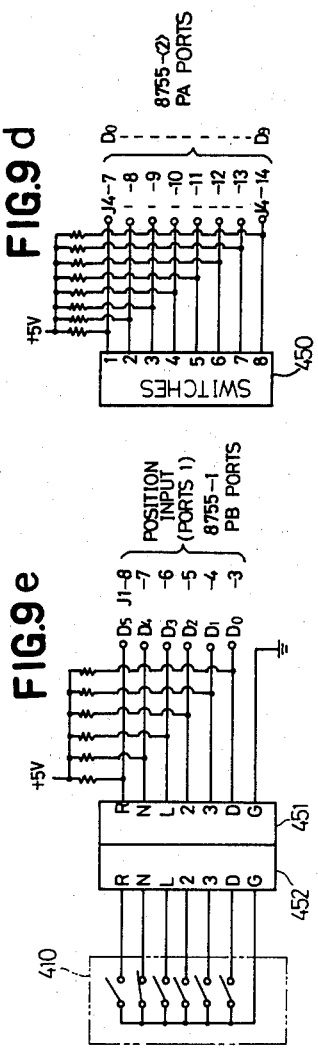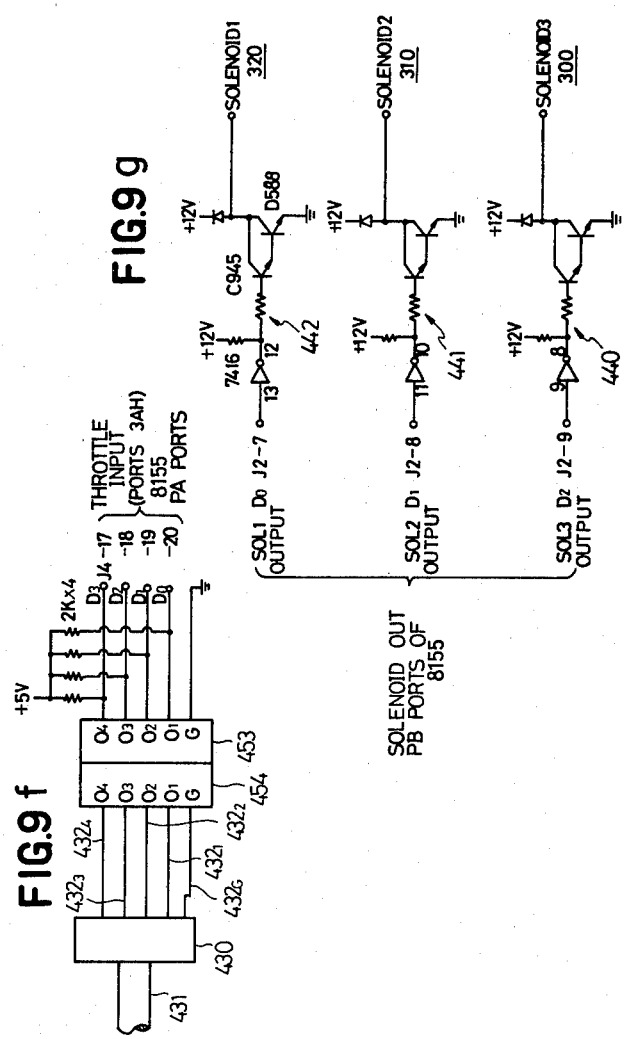

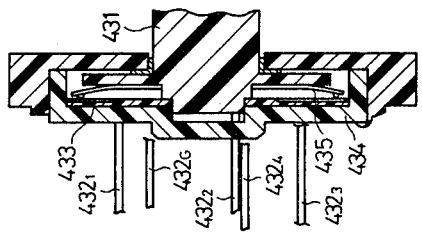
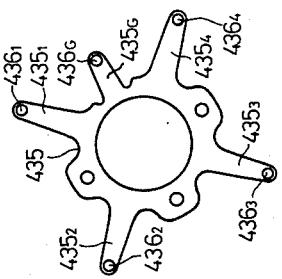
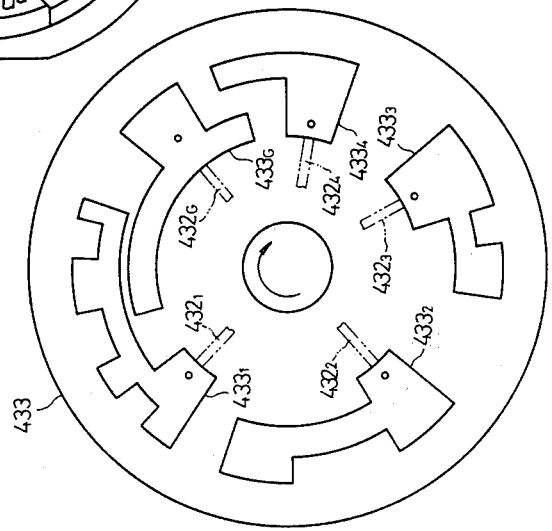

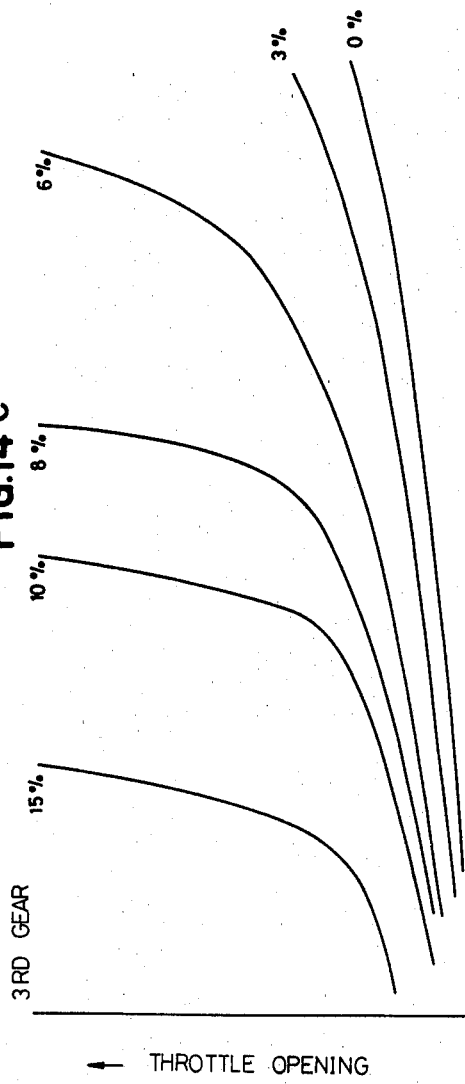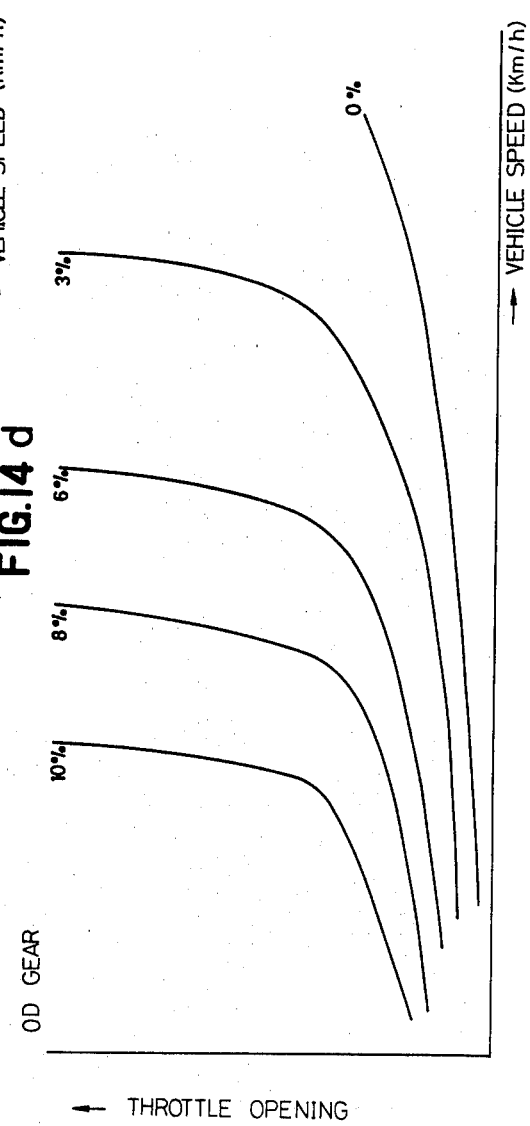

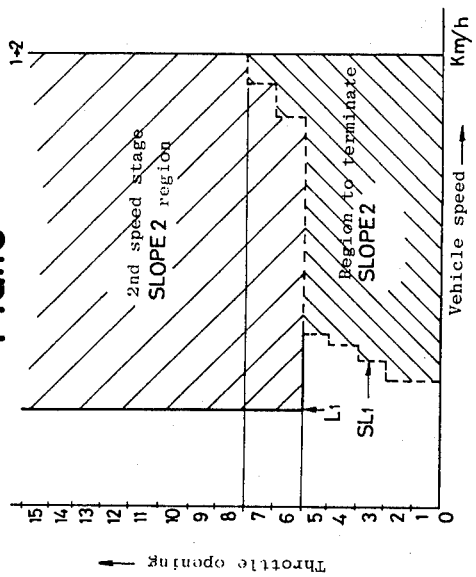
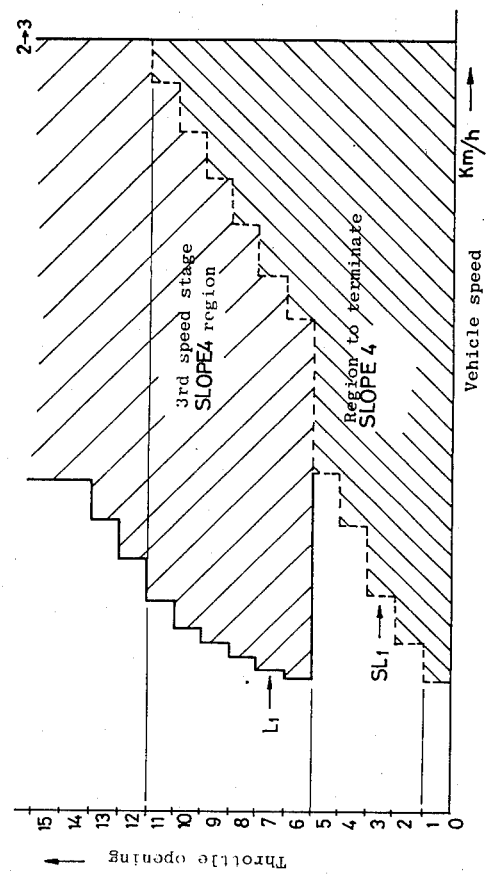

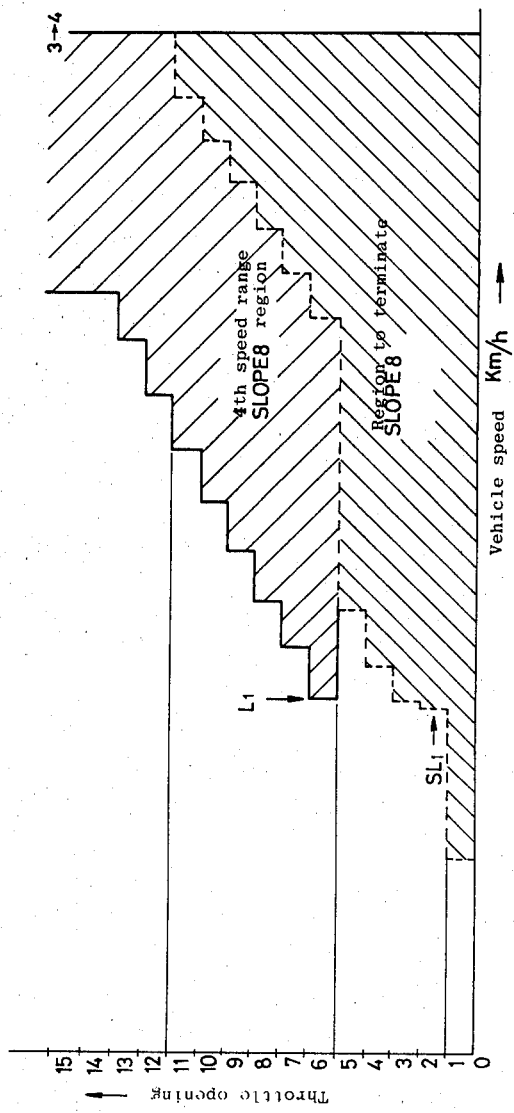

LOCKUP CONTROLLING SYSTEM FOR VARIABLE SPEED, AUTOMATIC TRANSMISSION

BACKGROUND OF THE INVENTION

The invention relates to an electronic control of a variable speed, automatic transmission mounted on a vehicle which is provided with a torque converter having a directly coupled clutch, in particular, to the control of an automatic lockup of the directly coupled clutch.

In a conventional practice, the lockup control of such transmission takes place in a manner such that the directly coupled clutch is actuated to couple the output shaft of the torque converter directly with an engine output shaft (lockup) automatically above a given vehicle speed in a particular speed stage, for example, a third or fourth speed stage and to deactuate the clutch to connect the input shaft of the torque converter with the engine output shaft at other times.

The torque converter has the feature that it enables a smooth starting, acceleration and speed change in accordance with the magnitude of a load while preventing or minimizing the drawbacks such as a knocking of an engine or an engine stop.

However, there is a problem that under a low load condition and a high rotation of the engine, a fluid coupling condition prevails to prevent a speed change from occurring, resulting in a degraded fuel cost which is attributable to a power loss due to slippage. One technique to overcome this problem is the use of the torque converter having the directly coupled clutch. By directly coupling the engine output shaft with the output shaft of the torque converter (lockup), the power loss is reduced, thus advantageously improving the fuel cost.

However, in the prior art practice, the lockup takes place only in response to a vehicle speed above a given value in the third speed stage or overdrive. Accordingly, the improvement achieved in respect of the fuel cost is only slight, and if an accelerator pedal is depressed to an increased degree, difficulties are experienced that the engine is subject to a knocking phenomenon or the torque converter fails to provide a desired torque amplification effect, thus resulting in a power performance which is less than desired. To obtain the respective advantages of the improved fuel cost through the lockup and the speed change through the torque converter, a complicated control is required as will be mentioned later. Since the prior art could only achieve a simple control of activating the lockup above a given vehicle speed in the third speed stage (for vehicles having up to the third speed stage) or overdrive (for vehicles having the fourth speed stage or overdrive range), so that the vehicle speed where the lockup is activated has been a compromise between the fuel cost and the power performance demand inasmuch as the power performance is greatly reduced if the lockup takes place at lower speed in order to improve the fuel cost preferentially while a reduction in the fuel cost is diminished during the normal running condition if the lockup takes place at a higher speed in order to improve the power performance preferentially.

SUMMARY OF THE INVENTION

It is a first object of the invention to enable a lockup operation in each of the speed stages so that the torque converter activated condition is obtained in a region where the speed change effect by the torque converter is effective to thereby prevent a reduction in the power performance while achieving a lockup condition in a region where the speed change effect is ineffective, and to achieve an improvement in the fuel cost by applying the lockup control to each of the speed stages to extend the extent where the lockup is utilized.

According to the invention, it is found that a lockup may be advantageously used for a combination of the engine torque and the number of revolutions of the engine in each of the speed stages. Considering this in more detail, reference is made to FIG. 1 where it is assumed that an engine is operated at an operating point A shown therein in which the output shaft of a torque converter which runs under a lockup condition, with a gear ratio of unity for a speed stage establishing transmission, which follows the torque converter, exhibits a torque of $T_O$ and a number of revolutions of $N_O$, with a throttle opening of 30%.

$$T_{OA} = T_{ELU} \tag{1}$$

$$N_{OA} = N_{ELU} \tag{2}$$

where $T_{OA}$ represents the torque of the output shaft of the torque converter at point A, $T_{ELU}$ the engine torque at point A, $N_{OA}$ the speed of rotation of the output shaft of the torque converter at point A and $N_{ELU}$ the speed of rotation of the engine at point A.

Assuming that the lockup is now terminated and the input shaft of the torque converter is coupled to the engine output shaft, the operating point of the engine shifts to a point B.

$$T_{OB} = t \times T_{ETC} \tag{3}$$

$$N_{OB} = e \times N_{ETC} \tag{4}$$

where $T_{OB}$ represents the torque of the output shaft of the torque converter at point B, $t$ the torque ratio, namely, the output torque/the input torque of the torque converter, $T_{ETC}$ the engine torque at point B, $N_{OB}$ the speed of rotation of the output shaft of the torque converter at point B, $e$ the slip rate of the torque converter, and $N_{ETC}$ the speed of rotation of the engine at point B.

To make the vehicle speed equal at both points A and B, $$N_{OA} = N_{OB} \tag{5}$$

Accordingly, $$\begin{aligned} e &= N_{OB}/N_{ETC} \\ &= N_{OA}/N_{ETC} \\ &= N_{ELU}/N_{ETC} \end{aligned} \tag{6}$$

The torque ratio $t = T_{OB}/T_{ETC}$, is uniquely determined for each torque converter, as illustrated in FIG. 2 and the engine torque generally decreases with an increasing number of revolutions except when a high throttle opening is used, as shown by a solid line in FIG. 1.

It follows from the equations (3) and (1)

$$T_{OB} \leq T_{OA} \text{ for } t \leq T_{ELU}/T_{ETC} \tag{7}$$

For $T_{OB} \leq T_{OA}$, the lockup operation is advantageous since a greater torque ($T_{OB}$) is obtained from the output shaft of the torque converter than when unlocked or when lockup is terminated.

FIG. 3 indicates by solid lines, individual points where $T_{OB} = T_{OA}$ applies for each throttle opening, and the hatched area represents a region where the lockup operation is more advantageous. On the other hand, a hatched region in FIG. 4a represents a region where the lockup operation is advantageous and which is determined by the relationship between the throttle opening and the number of revolutions of the engine which is converted into the number of revolutions of the output shaft of the torque converter. FIG. 4b illustrates individual regions associated with each speed stage where the lockup operation is advantageous. In this Figure, solid lines represent the boundary between the speed stages where 1, 2, 3 and 4 represent the first, the second, the third and the fourth speed stages, respectively. The hatched areas spaced from each solid line indicate those regions where the lockup operation is advantageous in each of the second, the third and the fourth speed stage, as viewed from left to right. In the first speed range, the region where the lockup operation is advantageous is limited, and since the speed is immediately changed to the second speed stage, no lockup operation is utilized and the torque converter is always maintained activated to terminate the lockup in the first speed stage in accordance with the invention. Accordingly, no region where the lockup operation is advantageous is indicated in the first speed stage.

In accordance with the invention, regions where the lockup operation is utilized are established as shown in FIG. 4c in a manner corresponding to the regions in each speed stage where the lockup operation is advantageous. In FIG. 4c, solid lines indicate the boundary for the lockup operation for each of the second, the third and the fourth speed stage as viewed from left to right. Broken lines indicate the boundary where the lockup operation is terminated for each of the second, the third and the fourth speed range, as viewed from left to right. The boundary for the lockup operation and the boundary for the termination of lockup are separated from each other in order to avoid an instability that the system may repeatedly alternate between the lockup and the unlock condition in response to a small variation in the vehicle speed.

The respective boundaries shown in FIG. 4c are fixedly stored in a read-only semiconductor memory (hereafter referred to as ROM), for which a throttle opening is utilized as an address to access it to read a minimum vehicle speed where the lockup operation is activated. For the convenience of description to follow, those areas of the memory where the speed ranges are stored are collectively referred to as tables, and are designated as indicated in the Table 1 below.

TABLE 1

| Designation | Stored Contents |
|---|---|
| Table $A_{LU}$ | minimum vehicle speed for lockup in the second speed range |
| Table $B_{LU}$ | minimum vehicle speed for lockup in the third speed range |
| Table $C_{LU}$ | minimum vehicle speed for lockup in the fourth speed range |
| Table $A_{TC}$ | maximum vehicle speed where the lockup is terminated in the second speed range |
| Table $B_{TC}$ | maximum vehicle speed where the lockup is terminated in the third speed range |
| Table $C_{TC}$ | maximum vehicle speed where the lockup is terminated in the fourth speed range |

During the time the vehicle is running, if it is running in the second speed stage, it is initially determined where the lockup condition is established. When the lockup condition is established, the table $A_{TC}$ is specified, and an actual throttle opening is used as an address to read the maximum vehicle speed in the table $A_{TC}$ for comparison with the actual vehicle speed. If the latter is less than the former, the lockup is terminated or the directly coupled clutch is released while if the latter exceeds the former, the lockup condition is continued. On the contrary, if the vehicle is running under its unlock condition, the table $A_{LU}$ is specified, and the actual throttle opening is used as an address to read the minimum speed in the table $A_{TC}$ for comparison with the actual vehicle speed. If the latter exceeds the former, the lockup is established or the directly coupled clutch is turned on while if the latter is less than the former, the unlock condition is continued. Similarly, if the vehicle is running in its third speed range, the table $B_{TC}$ is specified when the lockup condition is established while the table $B_{LU}$ is specified when the unlock condition prevails. In the fourth speed range, the table $C_{TC}$ is specified when the lockup condition is established while the table $C_{LU}$ is specified when the unlock condition prevails.

As mentioned above, the lockup boundaries in each of the speed stages are previously stored in a memory such as ROM. During the time the vehicle is running, a throttle opening and a vehicle speed are periodically sampled for comparison with data stored in the memory to derive a lockup controlling information. While in the foregoing description, the vehicle speeds which represent the boundaries for the lockup are fixedly stored in the memory utilizing throttle openings as addresses, the vehicle speeds may be utilized as addresses while fixedly storing throttle openings corresponding to the boundaries of the lockup. Additionally, while the throttle opening and the vehicle speed are used as reference data which is utilized to control the lockup operation, any other physical variable which has a unique relationship with such parameters may also be utilized. By way of example, a negative pressure of the engine or an engine torque may be substituted for a throttle opening. Alternatively, an engine torque and the number of revolutions of the engine may be used as illustrated in FIG. 3. The vehicle speed may be replaced by the number of revolutions of the engine.

Problems result from activating the lockup operation in a number of speed stages that when an accelerator pedal is released under the lockup condition or an engine brake is applied, excessive shocks may be applied to the automatic transmission and the engine and that the vehicle speed may undergo a temporary large variation to make the driving performance unstable. It will be appreciated that when the lockup is used in a number of speed stages, such shocks or variations of a vehicle speed may frequently occur as the accelerator pedal is released.

Therefore, it is a second object of the invention to improve the fuel cost by controlling the lockup in more than one speed stages to enhance the power efficiency of the variable speed automatic transmission while reducing the shocks or variations of the vehicle speed as the accelerator pedal is released.

To accomplish this object, in accordance with the invention, the lockup is terminated or a connection of the torque converter is made when the throttle opening is substantially equal to zero or when the accelerator pedal is released. In this manner, shocks applied to the engine or rapid changes in the vehicle speed can be eliminated when the accelerator pedal is suddenly released during the acceleration or when the engine brake is applied during a temporary lockup condition.

Another problem associated with the use of the lockup operation in a number of speed stages is that a shift operation under the lockup condition causes shocks of an increased magnitude to be applied to the automatic transmission and the engine and also causes a temporary fluctuation in the vehicle speed, resulting in an unstable driving performance. Obviously the use of the lockup operation in a number of speed stages increases the chances for these unfavorable conditions to occur.

It is a third object of the invention to improve the fuel cost and to enhance the power efficiency of the automatic transmission by controlling the lockup in more than one speed stages while reducing the shocks or variations in the vehicle speed during the shift operation.

A fourth object is to provide a technique for controlling the lockup which is compatible with the automatic shift operation.

To achieve these objects, in accordance with the invention, the lockup is initially terminated during a shift operation in order to prevent a rapid change in the speed of the engine by means of the torque converter, and the lockup is re-established or activated at a given time interval after the shift operation when variations occurring in the operating condition of the engine in response to the shift operation have subsided. The unlocked interval during the shift operation is preferably chosen in coordination with the operating condition of the engine. The parameter which indicates the operating condition of the engine may comprise a throttle opening or a variation thereof, for example. Accordingly, in a preferred embodiment of the invention, the lockup is terminated before the shift operation takes place, and the shift operation actually is initiated at a given time interval after the termination of the lockup which is determined by the prevailing throttle opening and a variation thereof. Even after the shift operation, the lockup is maintained terminated during another given interval which is again determined by the prevailing throttle opening and a variation thereof.

Data read-out from the ROM and the data comparison preferably takes place by utilizing a microcomputer which is used as an electronic control system. When a microcomputer is used, the shift operation can also be controlled in a relatively simple manner in addition to the lockup control, by fixedly storing associated data in the ROM. In an embodiment of the invention which will be described below, a microcomputer effects a lockup control and a shift control based on data stored in the ROM. It is to be understood that in the embodiment to be described below, the shift control is achieved in the similar manner as that disclosed in U.S. Pat. No. 4,335,428.

Other objects and advantages of the invention will become apparent from the following detailed description with reference to the attached drawings wherein corresponding parts are designated by like reference characters.

BRIEF DESCRIPTION OF THE DRAWINGS

FIG. 10a is a plan view of the throttle opening sensor;

FIG. 10b is a cross section taken along the line XB—XB shown in FIG. 10a;

FIG. 10c is an enlarged plan view of a printed circuit substrate;

FIG. 10d is a plan view of a slider used in the sensor;

FIG. 10e is a table indicating a number of output codes produced by the throttle opening sensor of FIG. 10a;

FIG. 11b is a cross section taken along the line X1B shown in FIG. 11a;

FIGS. 12b, 12c and 12d graphically illustrate modified shift reference data is written into a random access memory on the basis of the data shown in FIG. 12a;

FIGS. 15a, 15b and 15c graphically illustrate slope running regions and flats running regions in each of the speed ranges;

DESCRIPTION OF PREFERRED EMBODIMENT

Figure 5:
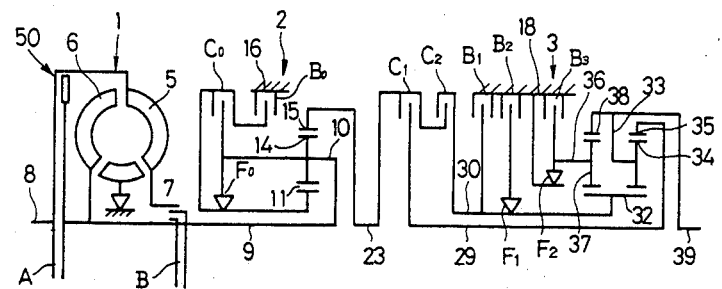
FIG. 5 is a block diagram of one form of an automatic, variable speed transmission to which the invention may be applied.

Referring to FIG. 5, there is shown one form of hydraulic automatic, variable speed transmission with an overdrive mechanism. The transmission includes a torque converter 1 having a directly coupled clutch, an overdrive mechanism 2, and a gear transmission 3 capable of switching between three forward speed ranges and a reverse range. The torque converter 1 is of a well known construction, and includes a pump 5, a turbine 6 and a stator 7. The pump 5 is connected to an engine crankshaft 8 while the turbine 6 is connected to a turbine shaft 9. The turbine shaft 9 represents an output shaft of the torque converter 1, and also forms an input shaft of the overdrive mechanism 2 and is connected to a carrier 10 of an epicyclic gearing in the overdrive mechanism. Directly coupled clutch 50 is interposed between the engine crankshaft 8 and the turbine shaft 9, and mechanically connects the both shafts 8, 9 together whether it is actuated. A planetary pinion 14 is rotatably carried by the carrier 10, and meshes with a sun gear 11 and a ring gear 15. Interposed between the sun gear 11 and the carrier 10 are multiple disc overdrive clutch $C_0$ and an overdrive one way clutch $F_0$. A multiple disc overdrive brake $B_0$ is interposed between the sun gear 11 and a housing of the overdrive mechanism or an overdrive casing 16.

The ring gear 15 of the overdrive mechanism 2 is connected to an input shaft 23 of the gear transmission 3. A multiple disc front clutch $C_1$ is disposed between the input shaft 23 and an intermediate shaft 29 while a multiple disc reverse clutch $C_2$ is disposed between the input shaft 23 and a sun gear shaft 30. A multiple disc brake $B_2$ is disposed in series with a multiple disc brake $B_1$ and a one way clutch $F_1$ across the sun gear shaft 30 and a transmission casing 18. A sun gear 32 is mounted on the sun gear shaft 30. A pair of epicyclic gearings are formed by the sun gear 32, a carrier 33, a planetary pinion 34 carried by the carrier, a ring gear 35 meshing with the pinion, another carrier 36, a planetary pinion 37 carried by the carrier 36 and a ring gear 38 meshing with the pinion 37. In one epicyclic gearing, the ring gear 35 is connected to the intermediate shaft 29 while its carrier 33 is connected to the ring gear 38 of the other epicyclic gearing, these carrier and the ring gear being connected to an output shaft 39. In the other epicyclic gearing, a multiple disc brake $B_3$ and a one way clutch $F_2$ are disposed between the carrier 36 and the transmission casing 18.

The hydraulic automatic transmission with overdrive mechanism is adapted to change the speed between the four speed ranges including the overdrive (O/D) and a single reverse range by manual operation, by engaging or disengaging the various clutches and brakes in accordance with an engine output and a vehicle speed by means of a hydraulic control system to be described below.

The Table 2 below indicates the relationship between the shift gear positions and the operating conditions of the clutches and brakes.

TABLE 2

| Shift position | Frictional device | | | | | | | | | |
|---|---|---|---|---|---|---|---|---|---|---|
| | Cl. $C_0$ | Cl. $C_1$ | Cl. $C_2$ | Br. $B_0$ | Br. $B_1$ | Br. $B_3$ | Br. $B_2$ | O.W.Cl. $F_0$ | O.W.Cl. $F_2$ | O.W.Cl. $F_1$ |
| Parking (P) | o | x | x | x | x | o | x | — | — | — |
| Reverse (R) | o | x | o | x | x | o | x | locked | locked | — |
| Neutral (N) | o | x | x | x | x | x | x | — | — | — |
| Forward | | | | | | | | | | |
| D-range 1st | | | | | | | | locked | locked | overrun |
| 2nd | | | | | | | | locked | overrun | locked |
| 3rd | | | | | | | | locked | overrun | overrun |
| O.D. (4th) | | | | | | | | overrun | overrun | overrun |
| 3-range 1st | | | | | | | | locked | locked | overrun |
| 2nd | | | | | | | | locked | overrun | locked |
| 3rd | | | | | | | | locked | overrun | overrun |
| 2-range 1st | | | | | | | | locked | locked | overrun |
| 2nd | | | | | | | | locked | overrun | locked |
| L-range | | | | | | | | locked | locked | locked |

In this Table, o represents an engaged condition of each of the clutches and brakes while x represents a disengaged condition thereof.

Figure 6:
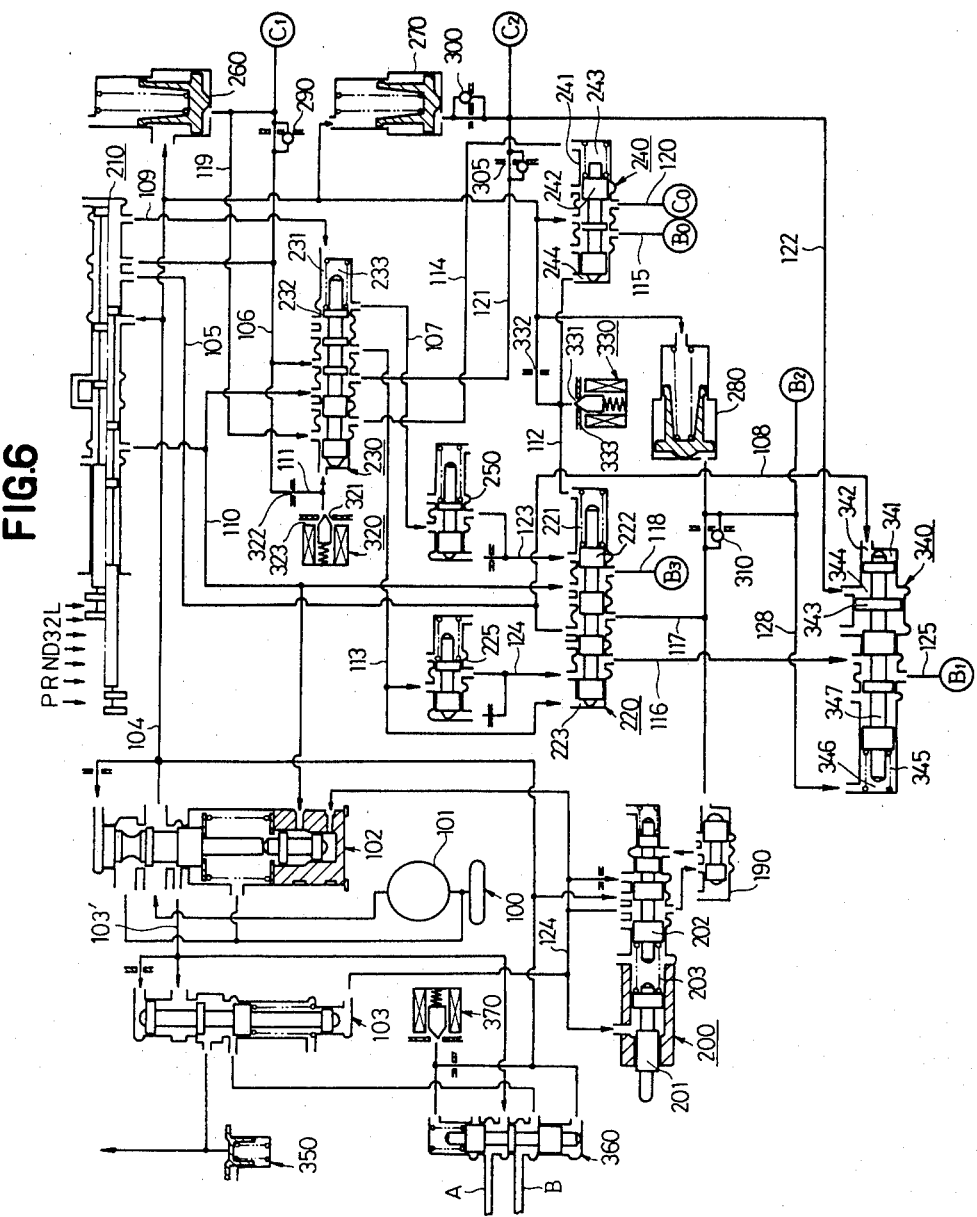
FIG. 6 is a block diagram of an oil pressure control system which controls the operation of the automatic transmission shown in FIG. 5.

An oil pressure circuit which selectively operates the clutches $C_0$, $C_1$, $C_2$, the brakes $B_0$, $B_1$, $B_2$, $B_3$ and the directly coupled clutch 50 of the torque converter to effect a shift operation is illustrated in FIG. 6. The oil pressure circuit shown in FIG. 6 includes an oil reservoir described later, and the gear condition of the automatic transmission.

TABLE 4

| Manual valve shift position | N | D | | | | R |
|---|---|---|---|---|---|---|
| Speed stage | | 1st | 2nd | 3rd | 4th | |
| First solenoid valve 320 | deenergized | energized | energized | deenergized | deenergized | energized |
| Second solenoid valve 330 | deenergized | energized | deenergized | energized | deenergized | deenergized | voir 100, an oil pump 101, a pressure regulating valve 102, an auxiliary pressure regulating valve 103, a cutback valve 190, a throttle valve 200, a manual valve 210, a 1-2 shift valve 220, a 2-3 shift valve 230, a 3-4 shift valve 240, a low coast modulator valve 250, an intermediate coast modulator valve 255, accumulator valves 260, 270, 280, flow control valves with check valves 290, 300, 305, 310, solenoid valves 320, 330, a dual sequence valve 340, a cooler bypass valve 350, a lockup clutch control valve 360, a lockup control solenoid valve 370 and a number of oil paths which provide an interconnection between these valves and oil pressure servo mechanisms of the clutches and brakes.

An operating oil pumped out of the reservoir 100 by means of the oil pressure pump 101 is adjusted to a given oil pressure (line pressure) by means of the pressure regulating valve 102 for supply to an oil path 104 and an oil path 103'. The hydraulic oil fed from the oil path 103' to the auxiliary pressure regulating valve 103 is controlled to a torque converter pressure, a lubricant oil pressure and a cooler pressure having given values which depend on the throttle pressure of the throttle valve 200. The manual valve 210 which is connected to the oil path 104 is connected with a shift lever which is disposed adjacent to a driver's seat and is selectively displaced to one of P, R, N, D, 3, 2, and L positions in accordance with a speed range established by a manual operation of the shift lever. The Table 3 below indicates a communication between the oil path 104 on one hand and other oil paths 105, 106, 109 and 110 in the respective positions of the shift lever.

TABLE 3

|  | P | R | N | D | 3 | 2 | L |
|---|---|---|---|---|---|---|---|
| oil path 105 |  | o | o | o | o | o |  |
| oil path 106 |  |  |  | o | o | o | o |
| oil path 109 |  |  |  |  |  |  | o |
| oil path 110 | o |  |  |  |  |  |  |

It is to be noted that o in the Table indicates that a communication is established.

The 2-3 shift valve 230 is controlled by the first solenoid valve 320, which operates to close a valve port 321 to feed an oil pressure to an oil path 111 communicating with the oil path 106 through an orifice 322 when deenergized, and which operates to open the valve port 321 to discharge the hydraulic oil from the oil path 111 through a discharge port 323 when energized. The 1-2 shift valve 220 and the 3-4 shift valve 240 are controlled by the second solenoid valve 330, which operates to close its valve port 331 to feed an oil pressure to an oil path 112 communicating with the oil path 104 through an orifice 332 when deenergized and which operates to open the valve port 331 to discharge the hydraulic oil from the oil path 112 through a discharge port 333 when energized. The Table 4 below indicates the energization or deenergization of the solenoid valves 320, 330 which are controlled by an electronic circuit to be The 1-2 shift valve 220 is provided with a spool 222 which is biased in one direction by a spring 221. In the first speed stage, since the solenoid valve 330 is energized to discharge the hydraulic pressure from the oil path 112, the spool 222 is driven to its right-hand position shown in response to the hydraulic pressure supplied to its left-hand oil chamber 223 through an oil path 113. In the second speed stage, the solenoid valve 330 is deenergized, whereby an oil pressure is fed to the oil path 112 to urge the spool 122 to its left-hand position. In the third and the fourth speed stage, the spool 222 is locked at its left-hand position since the hydraulic pressure is discharged from its left-hand oil chamber through the oil path 113 as a result of the 2-3 shift valve having its spool 232 urged to its right-hand position, as will be further described later.

The 2-3 shift valve 230 is provided with a spool 232 which is urged in one direction by a spring 231. In the first and the second speed stage, the solenoid valve 320 is energized to prevent a build-up of an oil pressure in the oil path 111, whereby the spool 232 is urged to its left-hand position under the resilience of the spring 231. In the third and the fourth speed stage, the solenoid valve 320 is deenergized to feed an oil pressure to the oil path 111, whereby the spool 232 is urged to its right-hand position.

The 3-4 shift valve 240 is provided with a spool 242 which is urged in one direction by a spring 241. In the first and second speed stage, the line pressure is fed through an oil path 114 to an oil chamber 243, whereby the spool 242 is locked at its left-hand position. In the third and the fourth speed stage, the hydraulic pressure is discharged from the oil path 114. In addition, in the third speed stage, the solenoid valve 330 is energized to discharge any hydraulic pressure from the oil path 112, whereby the spool 242 remains at its left-hand position under the resilience of the spring 241 while in the fourth speed stage, the solenoid valve 330 is deenergized to feed an oil pressure to the oil path 112, which causes the spool 242 to assume its right-hand position.

The throttle valve 200 includes an indicator valve 201 which strokes in accordance with the degree of depression of the accelerator pedal to compress a spring 203 disposed between the valve 201 and a valve spool 202, thereby producing a throttle pressure in an oil path 124.

In the N position of the manual valve 210, the solenoid valve 330 is deenergized, whereby an oil pressure is present in the oil path 112. Accordingly, an oil pressure is supplied to the left-hand oil chamber 244 of the 3-4 shift valve 240, the spool 242 of which is therefore driven to its right-hand position. Under this condition, the oil path 104 communicates with an oil path 115 through the 3-4 shift valve 240, whereby the brake $B_0$ is engaged. An oil path 120 communicates with a drain port and have no pressure therein, whereby the clutch $C_0$ remains open. In addition, an overdrive gear engagement is achieved in the overdrive mechanism 8.

By manually shifting the manual valve 210 to its R position, an oil pressure is produced in the oil path 110, whereby an oil pressure is supplied to the right-hand oil chamber 243 of the 3-4 shift valve 240 through the 2-3 shift valve 230 which has its spool 232 located at its left-hand position and through the oil path 114. As a result, an overdrive gear engagement is maintained in the overdrive mechanism 2 for a time interval on the order of one second during the N-R shift while a reversing gear engagement is achieved in the epicyclic gearing 8. After the time interval on the order of one second has passed subsequent to the N-R shift, the oil pressure within the oil chamber 243 increases to drive the spool 242 to the left, whereby the oil path 104 communicates with the oil path 120 to supply an oil pressure to the clutch $C_0$, thus engaging the latter. On the other hand, the hydraulic pressure is discharged from the oil path 115, whereby the brake $B_0$ is released. In this manner, the overdrive mechanism 2 turns into a direct coupling gear engagement, and the planetary gearing assumes a normal reversing condition.

During a manual N-D shift, and in the first speed stage, the spool 222 of the 1-2 shift valve 220 assumes its right-hand position, whereby the hydraulic pressure is removed from oil paths 116, 117 which communicate with the brakes $B_1$, $B_2$, respectively. No oil pressure is supplied to an oil path 118 which communicates with the brake $B_3$. Accordingly, all of the brakes $B_1$, $B_2$ and $B_3$ remain released.

In the first speed stage, the line pressure is supplied to the right-hand oil chamber 341 of the dual sequence valve 340 through an oil path 108 which is branched from the oil path 105, whereby a bias spring 345 associated therewith is compressed to cause its spool 347 to assume a left-hand position.

When a vehicle speed reaches a given value, the solenoid valve 330 is deenergized in response to an output from a microcomputer, whereby the spool 222 of the 1-2 shift valve 220 moves to the left, allowing the line pressure which is supplied through the paths 105, 117 to act through the flow control valve 310 and the accumulator 280 to cause a gradual engagement of the brake $B_2$. The line pressure is also supplied to the left-hand oil chamber 346 of the dual sequence valve 340 through an oil path 128. In response thereto, the spool 347 of the sequence valve 340 begins to be driven to the right at the time when the sum of the resilience of the spring 345 and the progressively increasing oil pressure in the oil chamber 346 exceeds the line pressure applied to its land 343. After a preselected time interval when the spool 347 has moved to the right, the brake $B_1$ is engaged by the oil pressure supplied thereto through a passage including the oil path 106, the 2-3 shift valve 230 which has its spool 232 located at its left-hand position as a result of the energization of the solenoid valve 320, the oil path 113, the intermediate coast modulator valve 255, an oil path 124, the 1-2 shift valve 220, an oil path 116, the dual sequence valve 340 and an oil path 125. In this manner, the second speed stage is established where an engine brake can be effective. During such process, the dual sequence valve 340 operates to control the timing when the brake $B_1$ is engaged after the engagement of the brake $B_2$ to achieve the second speed stage in the transmission.

A shift to the third speed stage is achieved when a throttle opening or a parameter has reached a given value, by the deenergization of the solenoid valve 320 in response to an output from the microcomputer, whereby the spool 232 of the 2-3 shift valve 230 moves to the right to supply an oil pressure to engage the clutch $C_2$ through the oil paths 106, 121 and the flow control valve 305 while simultaneously locking the spool 222 of the 1-2 shift valve 220 to its left-hand position under the combined effect of the resilience of the spring 221 and the removal of pressure from the oil chamber 223.

In the third speed stage, an oil path 122, which is branched from the oil path 121, feeds an oil chamber 344, defined between a land 342 and another land 343 having an increased diameter than the land 342 by a given amount, whereby the spool 347 of the dual sequence valve 340 is driven to the left to allow a communication of the oil path 125 with a drain port, thus releasing the brake $B_1$.

A shift to the fourth speed stage is achieved in the similar manner by the deenergization of the solenoid valve 330 in response to an output from the microcomputer, whereby the spool 242 of the 3-4 shift valve moves to right to remove the hydraulic pressure from the oil path 120 while supplying an oil pressure to the oil path 115, thus releasing the clutch $C_0$ and engaging the brake $B_0$.

A 4-3 down shift from the fourth to the third speed stage occurs in the opposite procedure from the 3-4 shift mentioned above. Specifically, the solenoid valve 330 is energized to cause the spool 242 of the 3-4 shift valve 240 to move to the right, thereby removing the hydraulic pressure from the oil path 115 and supplying an oil pressure to the oil path 120. Thus, the brake $B_0$ is released while the clutch $C_0$ is engaged. A 3-2 down shift from the third to the second speed stage occurs by the energization of the solenoid valve 320. This causes the spool 232 of the 2-3 shift valve 230 to move to the left, whereby the hydraulic pressure is removed from the oil path 121 to release the clutch $C_2$. After the engagement of the one way clutch $F_1$ has been completed, the hydraulic pressure is removed from the oil path 122, branched from the oil path 121, and the oil chamber 344 connected thereto, whereby the spool 347 of the dual sequence valve 340 is driven to the right under the combined effect of the oil pressure supplied to the oil chamber 346 through the oil path 128 and the resilience of the spring 345 and against the oil pressure supplied to the land 342. This achieves a communication between the oil paths 125 and 116, whereby the brake $B_1$ is engaged. During such process, the dual sequence valve 340 controls the timing between the engagement of the one way clutch $F_1$ and the engagement of the brake $B_1$.

When the manual valve 210 assumes its 3-position, the shift between the first, the second and the third speed stage takes place in the similar manner as in the D-position of the manual valve. However, since the line pressure is supplied to the right-hand oil chamber 243 of the 3-4 shift valve through the oil paths 106 and 114 to lock the spool 242 at its left-hand position, there occurs no shift to the fourth speed stage. If a D-3 shift is manually performed when the vehicle is running in the fourth speed stage in the D-position of the manual valve 210, the down shift to the third speed stage occurs immediately.

When the manual valve 210 assumes its 2-position, the same applies as in the D-position of the manual valve as far as the first speed stage is concerned. However, in the second speed stage, the brake $B_1$ is engaged through the oil paths 106, 116, allowing an engine brake to be applied. If a manual shift to the 2-position occurs during the time the vehicle is running in the third speed stage, the microcomputer provides an output to energize the solenoid valve 320 to enable a 3-2 down shift at the time when the vehicle speed has been reduced to a predetermined value.

When the manual valve 210 shifts to its 1-position, the oil pressure is supplied to the oil path 109, whereby the line pressure is supplied to the right-hand oil chamber 233 of the 2-3 shift valve 230, to lock the spool 232 at its left-hand position, immediately allowing a 4-2 or a 3-2 down shift. The 2-1 down shift occurs by the deenergization of the solenoid valve 330 is response to an output from the microcomputer at the time when the vehicle speed has been reduced to a given value. Simultaneously, the oil pressure in the oil path 109 is supplied through the oil path 107, the low coast modulator valve 250 and the oil paths 123, 118 to cause an engagement of the brake $B_3$.

The lockup clutch control valve 360 includes a spool, not designated, which is biased in one direction by a spring, not shown. When the lockup control solenoid valve 370 is deenergized, the same pressure prevails in the upper and the lower end chamber above and below the spool, whereby the latter assumes its lower position as shown under the resilience of the spring. As a result, the oil pressure prevailing in the oil path 103' is supplied to the oil path A of the directly coupled clutch 50 while the oil path B is connected to a drain pressure through the auxiliary pressure regulating valve 103 and the cooler bypass valve 350, whereby the directly coupled clutch 50 is released or unlocked. When the lockup control solenoid valve 370 is energized, the spool of the lockup clutch control valve 360 is driven upward against the resilience of the spring, with result that the oil path A of the directly coupled clutch 50 is connected to a drain pressure while the oil path B is supplied with the oil pressure prevailing in the oil path 103', thus coupling the directly coupled clutch 50 (lockup).

In the oil pressure circuit shown in FIG. 6, the single dual sequence valve 340 can be utilized to control the timing between the operations of the brakes $B_1$ and $B_2$ and the one way clutch $F_1$ during both the 1-2 shift and the 3-2 down shift.

Figure 7:
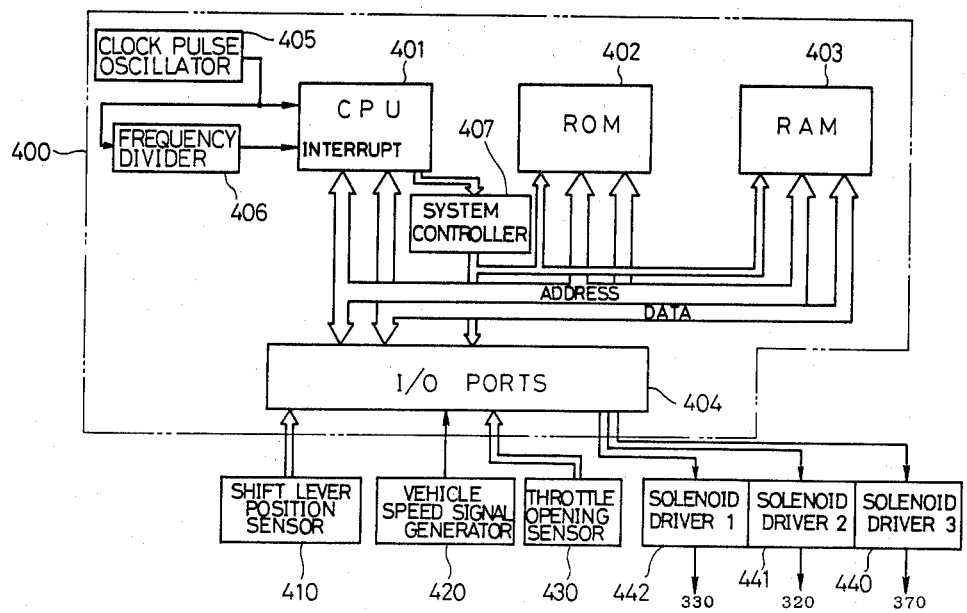
FIG. 7 is a block diagram of an electronic digital control system which controls the energization of certain solenoid valves located within the oil pressure control system of FIG. 6.
Figure 8:
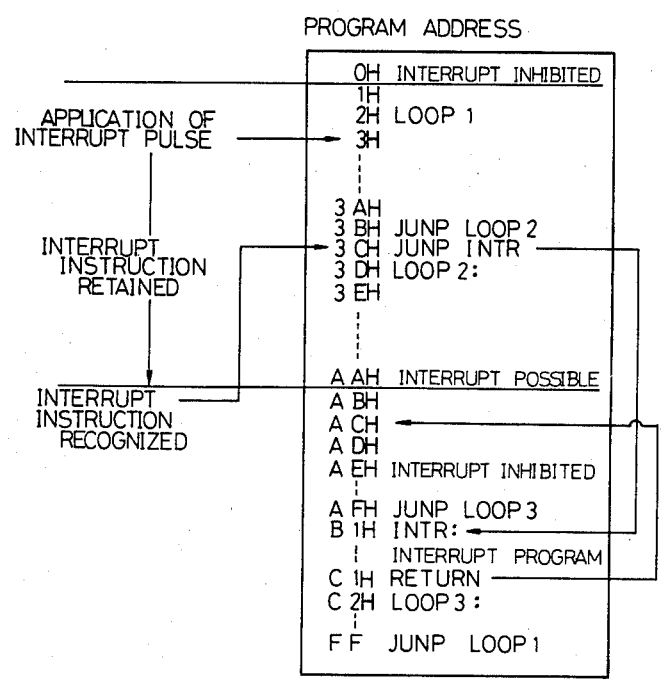
FIG. 8 is a sequence flow chart of a program which illustrates an interrupt operation performed by the control system shown in FIG. 7.

FIG. 7 schematically illustrates the overall arrangement of an electronic digital control system 400 which controls the opening and closing of the solenoid valves 370, 320 and 330. The control system 400 includes a large scale integrated semiconductor logic unit having the capability of a high level digital arithmetic operation, commonly referred to as a central processing unit or a microprocessor (hereafter referred to as CPU) as its essential component. Additionally, the control system includes a read-only memory 402 (hereafter referred to as ROM) in which programs controlling the logical operation of the logic unit as well as a variety of data are fixedly stored, a read-write memory (hereafter referred to as RAM) 403 for storing or reading the date read from ROM 402 or temporary input and output data, and input/output ports 404, a clock pulse oscillator 405, a frequency divider 406 and a system controller 407 which specifies a particular location within the read-write memory. It will be noted that CPU 401, ROM 402 and RAM 403 are interconnected by address bus, data bus and clock pulse bus. A basic clock is produced by the oscillator 405 and is applied to basic clock input terminals of the units 401 to 403 and 406. The frequency divider 406 performs a frequency division of the basic clock for application of its output to an interrupt terminal of CPU 401. In the embodiment shown, an interrupt operation takes place with the period of an output pulse from the frequency divider 406 in order to detect a change in the running condition of a vehicle from a flat road to a slope or vice versa and to constrain a switching of the running range or to perform such switching in a corresponding manner. Referring to FIG. 8 for describing the summary of an interrupt operation within CPU 401, the programs contained in ROM 402 are advanced one address by another by a program counter. An interrupt function refers to a forced transfer of an address contained in the program counter to a specified address (which is address 3CH in FIG. 8) in response to the application of the pulse to the interrupt terminal of the CPU 401. An interrupt instruction which causes the interrupt function to be performed is maintained in CPU 401, which prevents an interrupt instruction from being executed at a program address where the execution will result in an error. An interrupt instruction will be retained until an address ABH is reached where an interruptable program is stored and where the interrupt is recognized, changing the code of the program counter to a specified interrupt address (which is address 3CH in FIG. 8). When the program at such address is executed, the sequence is returned to the address ACH which is next to the particular address where the interrupt instruction has been recognized.

In addition to storing the program which is used to detect an interrupt and to execute it, ROM 402 also stores a number of program data as well as reference data which are utilized in the determination or detection by these programs, including a program for determining the speed range when running on a flat road and associated reference data; a program for changing the speed range; a program for detecting a running on a slope and associated reference data; a program to constrain the switching of the speed range; a program to terminate the constraint; a program to control the pressure by the solenoid valves; and a program to prevent the occurrence of crank noises. The execution of these programs principally depends on the shift lever position (L, 2, 3, D, R or the like), the vehicle speed (the rotational speed of the output shaft of the automatic, variable speed transmission) and the throttle opening. The execution of these programs results in the solenoid valves 370, 320 and 330 being opened or closed.

At this end, a shift lever position sensor 410, a vehicle speed signal generator 420, a throttle opening sensor 430 and a plurality of solenoid drivers 440, 441 and 442 are connected to the input/output ports 404.

In the subsequent description of FIG. 7 and succeeding Figures, the input/output ports 404 and the frequency divider 406 are treated as separate from ROM 402 and RAM 403, but it should be understood that there are ROM and RAM having such input/output ports contained on the single chip or RAM having the frequency divider and the input/output ports disposed on the single chip. Therefore, it should be understood that the illustration in the drawings and the description to follow comply with one denotation scheme and that there is no need to utilize the discrete units and elements as shown.

Figure 9A:
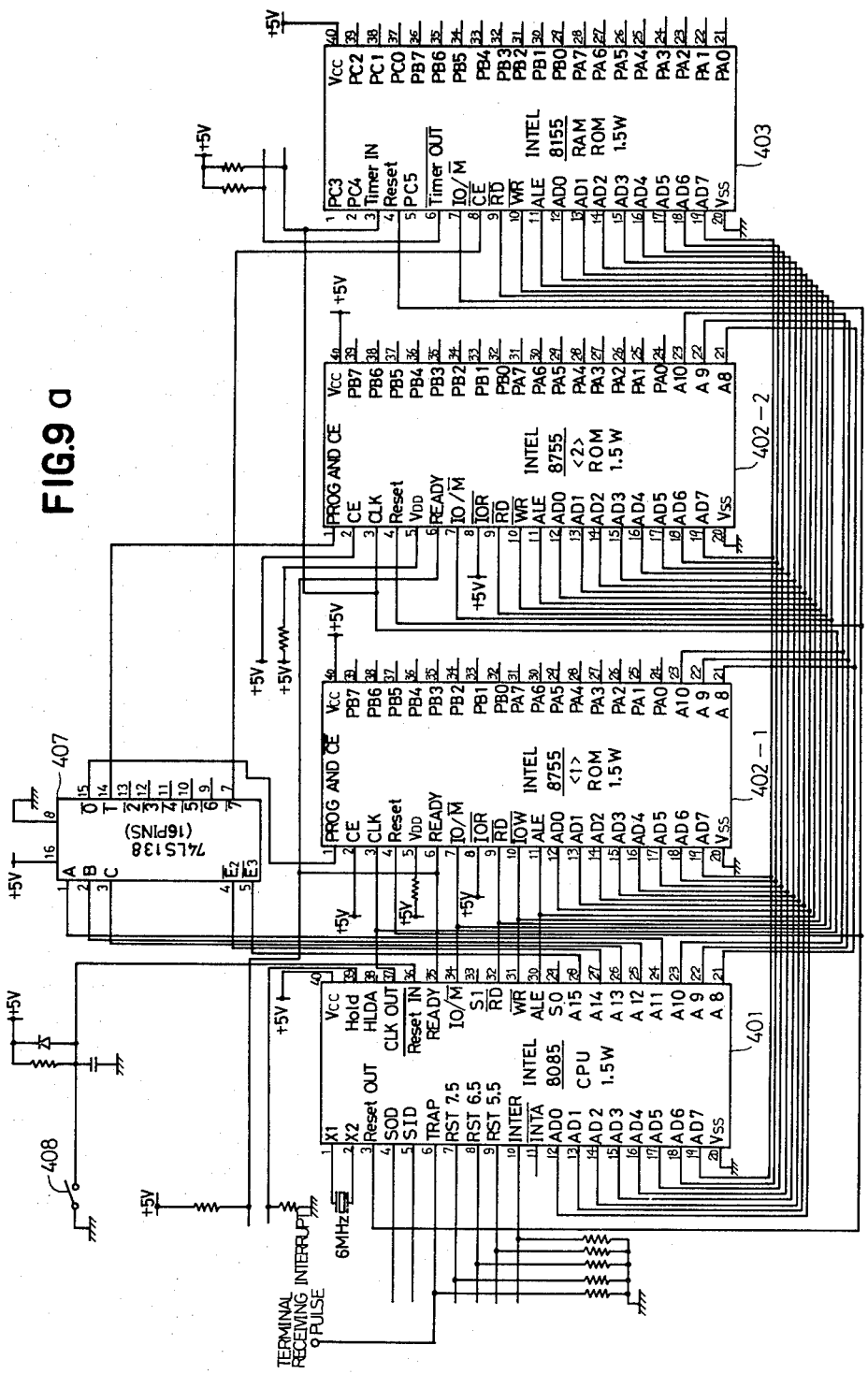
FIG. 9a is a more detailed block diagram of essential parts of the control system shown in FIG. 7.
Figure 9:
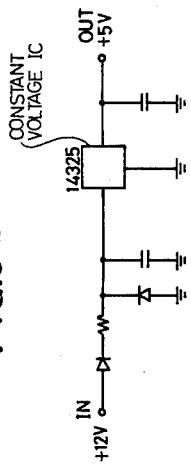
FIG. 9b is a circuit diagram of a power supply circuit.
FIG. 9c is a circuit diagram of a vehicle speed detector circuit.
FIG. 9d is a circuit diagram showing the connection of a switch which defines the time limit of a timer.
FIG. 9e is a circuit diagram of a shift lever position sensor and a connector which connects it to an input port.
FIG. 9f is a circuit diagram showing the connection of a throttle opening sensor.
FIG. 9g is a circuit diagram of solenoid drivers.
Figure 9:
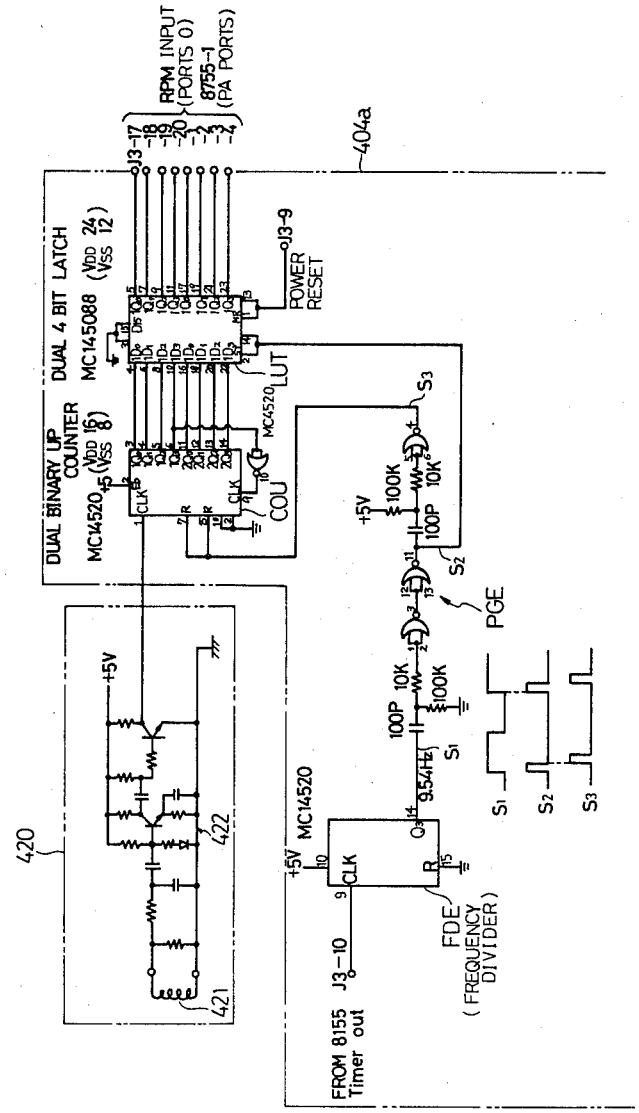

FIG. 9a shows one specific embodiment of the essential part thereof. In the embodiment shown, ROM 402 comprises a pair of chips 402-1 and 402-2, with a constant voltage of +5 V applied to various parts thereof. When a switch 407 is closed, a control operation is initiated with the leading one (START) of programs contained in ROM 402-1, 402-2, repeatedly performing various operations to be described later in accordance with the programs contained therein. The constant voltage of +5 V is supplied by a constant voltage circuit shown in FIG. 9b. The vehicle speed signal generator 420 comprises an induction coil 421 which cooperates with a permanent magnet connected to the output shaft of the transmission to detect a rotation thereof, and an associated pulse shaper 422, as indicated in FIG. 9c. The pulse shaper 422 produces pulses of a frequency which is proportional to the number of revolutions of the output shaft. These output pulses are fed to a count pulse input terminal CLK of a counter COU, the count of which is stored by a latch LUT. The counting operation and the latching operation continue so long as pulses of a given period are applied to the frequency divider FDE from the output terminal Timer OUT of RAM 403. Thus, the output code of the latch LUT represents a vehicle speed, which is applied to input ports PA0-PA7 of ROM 402-1.

A switch 450 (shown in FIG. 9d) which defines the time limit of a timer is connected to terminals PA0-PA7 of ROM 402-2 while switches of the shift lever position sensor 410 are connected to terminals PB0-PB7 of ROM 402-1 through connectors 451, 452 as shown in FIG. 9e. The throttle opening sensor 430 is connected to ports PA0-PA7 of RAM 403 through connectors 453, 454 as shown in FIG. 9f. Similarly, the solenoid drivers 440-442 as shown in FIG. 9g are connected to ports PB0-7 of RAM 403.

The throttle opening sensor 430 includes a shaft 431 which is connected to the rotating shaft of the throttle valve for rotation therewith, a plurality of rotary contacts fixedly carried by the shaft, and a plurality of fixed contacts which are equal in number to the number of rotary contacts. It represents a digital code generator of potentiometer type. A plan view of the sensor 430 as viewed from the side thereof where lead wires are taken out is shown in FIG. 10a while a cross section thereof taken along the line XB—XB is shown in FIG. 10b. The digital code generator 430 is designed to produce a 4 bit code so as to indicate 16 steps of throttle openings 0-15. Four output leads $432_1-432_4$ which transmit the first to the fourth digit, respectively, as well as a single ground connection lead $432_G$ are connected to split electrodes printed on a disc-shaped printed circuit substrate 433, which is shown in an enlarged plan view in FIG. 10c. As shown, the substrate 433 is formed with split electrodes $433_1-433_4$ on which the first to the fourth digit of the binary output appear, as well as a split electrode $433_G$ which is connected with the ground potential. The four split electrodes $433_1-433_4$ are disposed in different 90°-sectors of the substrate 433. The substrate 433 is fixedly mounted on a housing base 434. A slider 435 formed of a resilient material is fixedly mounted on the shaft 431, and is shown in plan view in FIG. 10d. As shown, the slider 435 is formed with four arms $435_1-435_4$ which are angularly spaced apart by 90°. Another arm $435_G$ is formed between the arms $435_1$ and $435_4$. The free end of these individual arms fixedly carry contact members $436_1-436_4$ and $436_H$, which are aligned with and engage the uneven, outermost portions of the split electrodes $433_1-433_4$ and an arcuate, innermost portion of the split electrode $433_G$, respectively, when the substrate 433 is mounted on the housing and the shaft 431 is mounted therein. Specifically, as the shaft 431 moves angularly over an extent of 90°, the contact member $436_G$ is maintained in engagement with the split electrode $433_G$ while the contact members $436_1-436_4$ move into or out of engagement with the corresponding split electrodes, depending on the outermost pattern of the respective electrodes. More specifically, considering the split electrode $433_1$, it assumes a ground potential when it is in engagement with the contact member $436_1$, whereby the lead $432_1$ which is connected therewith through a plating of a through-hole and an associated rear electrode also assumes a ground potential. However, when it is not engaged by the contract member $436_1$, the lead $432_1$ as well as the split electrode $433_1$ assume a level of +5 V because such potential is applied to the lead $432_1$ through connectors 453 and 454 as shown in FIG. 9f. In this manner, individual split electrodes $433_1-433_4$ are patterned to assume either a ground level or +5 V level depending on the angular position of the shaft 431 and hence the slider 435. In the present embodiment, the angular extent of 90° for rotation of the shaft 431 is divided into 16 segments, to provide 16 steps of the throttle opening. More specifically, the patterns of the respective split electrodes $433_1-433_4$ are chosen so as to provide a Gray code shown in FIG. 10e by four bit outputs $\theta_1-\theta_4$ on the leads $432_4-432_4$ corresponding to the throttle opening 0-15. In this code, "0" represents a ground level and "1" +5 V level. The purpose of choosing such pattern to provide a Gray code is to assure that a throttle opening which is represented by the outputs $\theta_1-\theta_4$ has no significant difference over the actual opening even if the contact members $436_1-436_4$ become momentarily or temporarily disengaged from the split electrodes $433_1-433_4$, respectively. By way of example, when the throttle opening changes from 3 (0010) to 4 (0110), in the transient condition until the contact member $436_3$ engages the split electrode $433_3$, the code indicative of the throttle opening remains to be 0010 so as to represent an opening 3, preventing an opening which significantly deviates from a value around the opening 4 to be indicated. If a normal binary denotation is employed, the opening 3 will be represented as 0011 and the opening 4 as 0100. When changing from 0011 to 0100, there will be produced those openings such as 0111 (opening 7), 0101 (opening 5), 0000 (opening 0), or 0001 (opening 1) which significantly deviate from either opening 3 or 4. However, with the throttle opening sensor 430, no such code will be produced which exhibits a significant deviation.

Figure 11A:
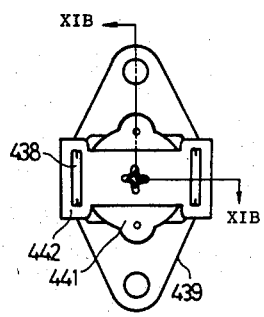
FIG. 11a is a front view of one of the solenoid valves shown in FIG. 6.
Figure 11B:
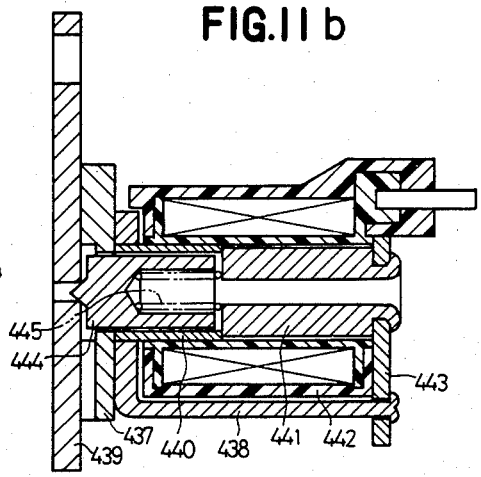

FIG. 11a shows a rear view of one of the solenoid valves 370, 320 and 330 which have an identical construction. A cross section thereof taken along the line XIB—XIB is shown in FIG. 11b. The solenoid valve comprises a valve plate 437 and a carrier 438 which are joined together by a spot welding, with an orifice plate 439 joined to the valve plate 437 by a projection welding. A sleeve 440 is inserted into an opening formed in the carrier 438 and its front end is disposed in abutment against the valve plate 437. Subsequently, the front end of a core 441 is forced against the rear end of the sleeve 440 to mount a coil case 442. Finally the rear end of the carrier 438 and the core 441 is caulked to a back plate 443. The solenoid valve includes a plunger 444 and a compression spring 445. In this solenoid valve, the sum of the thickness of the valve plate 437 and the length of the sleeve 440 determines a spacing between the orifice plate 439 and plunger 441 or a stroke through which the latter operates. The accuracy of such stroke depends only on the precision of the thickness of the valve plate 437 and the length of the sleeve 440, and any error in the length of the plunger 441 or the thickness of the back plate 443 has no influence whatsoever upon the stroke of the plunger 444.

Figure 12A:
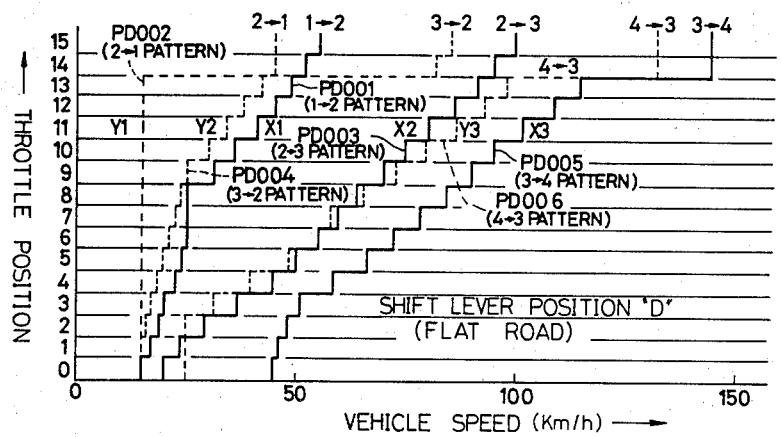
FIG. 12a graphically illustrates shift reference data stored in a read-only memory.
Figure 12:
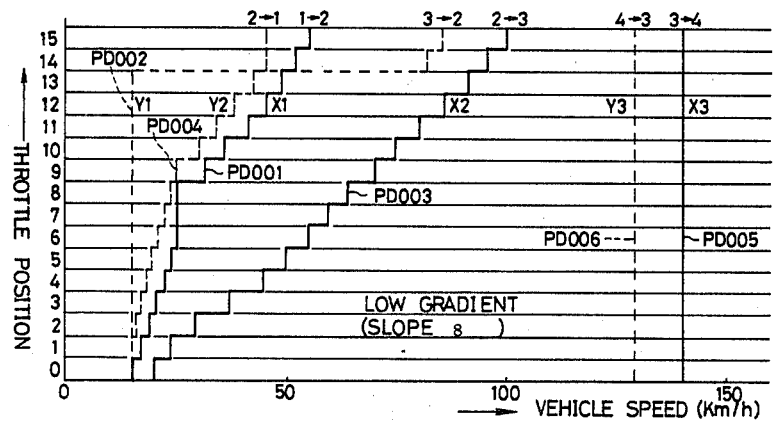
Figure 12:
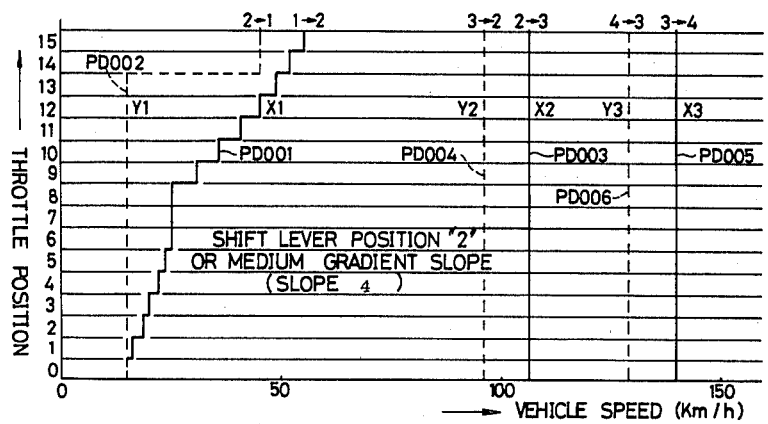
Figure 12:
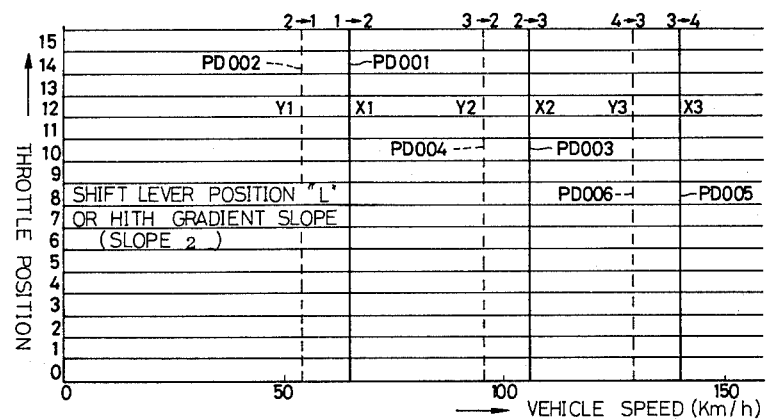

The pattern shown in FIG. 12a represents a reference pattern which is used to switch a speed range when the vehicle is running on the flat road and the shift lever is in its D-position. When the vehicle is running on a slope, the pattern is modified in accordance with the inclination of the slope to provide a reference data which is used to switch the speed range, modifying the original pattern into a pattern which constrains 3→4, 2→3 and 1→2 shifts when the shift lever is in its 3-, 2- and 1-position, respectively. Thus, FIG. 12a represents a standard pattern. A modification of the pattern takes place when a standard pattern is written into RAM 403 from ROM 402-1, 402-2, based on the position POSi of the shift lever and the inclination of the slope (SLOPE2, SLOPE4 and SLOPE8) detected in the interrupt program. Specifically, a reference data for switching a speed stage is produced by rewriting PD005 for the 3-position of the shift lever as shown in FIG. 12b, and rewriting PD005 and PD006 for the 3-position of the shift lever and a low gradient slope 8 as shown in FIG. 12b, both to a given vehicle speed or speeds which are independent from the throttle opening THRO, namely, to a maximum vehicle speed (140 km/h) which is available on the third gear of the vehicle which corresponds to the maximum rotational speed of the engine, at the time when the standard pattern is written into RAM 403. In a similar manner, for the shift lever position "2" and medium gradient slope 4, PD002-PD006 are rewritten as maximum vehicle speeds which are available on the second and the third gear and which are independent from the throttle opening THRO, as shown in FIG. 12c. For the shift lever position "L" and a high gradient slope 2, all of the patterns PD001-PD006 are rewritten as maximum vehicle speeds corresponding to the respective speed stages and which are independent from the throttle opening THRO, as indicated in FIG. 12d. Switching of the speed stage with reference to the patterns PD001-PD006 of these various modes takes place in the manner mentioned below. Specifically, a slope is detected by executing an interrupt program which takes place periodically in response to an output pulse from the frequency divider 406 (FIG. 7), and one of the modes shown in FIGS. 12a to 12d is selected. Assuming that the vehicle is running on a flat road and the shift lever is in its D-position, the patterns PD001-PD006 shown in FIG. 12a are specified, and reference is made to the current speed stage SR and a throttle opening $\theta$. If $\theta=9$, and SR=2, for example, the values of the vehicle speed Y1=15 and X2=70 for $\theta=9$ are read from patterns PD002 and PD003 which represent the boundaries between adjacent speed stages, and are compared against the actual vehicle speed AS. If AS<15=Y1, a 2→1 shift command is produced. If AS=70≧X2, a 2→3 shift command is produced. If 15<AS<70, no shift command is produced in order to maintain the current status. For other positions of the shift lever and slopes of different gradients 8-2, two values of the vehicle speed (corresponding to the boundary on the lower and higher speed side) are read from the patterns PD001-PD006 of a corresponding mode (FIGS. 12b to 12d) on the basis of the current speed stage, and are compared against the current value of the vehicle speed. While a switching to any speed stage takes place automatically for the shift lever position "D" and when the vehicle is running on a flat road, it is to be noted that for the 3-, 2- and L-positions of the shift lever or when the vehicle is running on a slope, the reference pattern data on the higher speed side, namely, the data against which the vehicle speed is to be compared, is predetermined to a value of the vehicle speed which corresponds to the maximum rotation of the engine in the respective speed stages. Consequently, if a driver effects acceleration while maintaining the shift lever in its 3-position, for example, a shift operation takes place when the maximum vehicle speed on the third gear is reached in order to prevent an overrun of the engine. Down shift patterns PD002, PD004 and PD006 are also shifted to enable a suitable engine braking operation. By fixing the up shift patterns and the down shift patterns which represents reference data to a high value of the vehicle speed which is independent from the opening of the throttle valve, a hunting which results from a temporary shifting operation is avoided when running on a slope. More specifically considering the selection of a speed stage, it will be noted in FIG. 12d that for SLOPE=2, the patterns PD001-PD006 are chosen so that the vehicle will run on the first gear since a suitable gear ratio will not be obtained when the vehicle is running on a slope on the second gear. Consequently, 1→2 shift point X1 and the 2→1 shift point Y1 are fixed to the higher speed side (X1=65 km/h and Y1=54 km/h in the example shown in FIG. 12d). In order to prevent the 1→3 and 1→4 shift, other shift points (X2, Y2, X3, Y3) are fixed to the higher speed than the 1→2 shift point (X2=106 km/h, Y2=96 km/h, X3=140 km/h and Y3=129 km/h in the example shown in FIG. 12d). For SLOPE=4, the patterns are chosen so that the vehicle will run on the second or the first gear since an appropriate gear ratio will not be obtained if the vehicle runs on a slope on the third gear. Accordingly, the shift patterns PD001 and PD002 for the flat road are used for the 1→2 shift and 2→1 shift. The 2→3 shift point X2 and the 3→2 shift point Y2 are fixed to the higher speed (X2=106 km/h and Y2=96 km/h in the example shown in FIG. 12c). In the same manner as for SLOPE=8, the 3→4 shift point X3 and the 4→3 shift point Y3 are fixed to the higher speed than X2 and Y2. For SLOPE=8, the patterns are chosen so that the vehicle will run on the third, the second or the first gear since a suitable gear ratio will not be obtained if the vehicle runs on the fourth gear. Hence, for 1→2, 2→1, 2→3 and 3→2 shifts, the shift patterns PD001, PD002, PD003 and PD004 for the flat road are used while fixing 3→4 shift point X3 and 4→3 shift point Y3 to the higher speed side (X3=140 km/h and Y3=129 km/h in the example shown in FIG. 11b). The shift lever position which is read by the shift lever position sensor is stored at an address POSi 2 while the value of POSi 2 which was stored previously is stored at an address POSi 1 as a previous shift lever position. The program will return to the start for the shift lever positions "N" and "R". However, it will be apparent that a necessary control of the solenoids 370, 320 and 330 can be made before returning to the start of the program. The speed stage which was stored previously is stored at an address SOLEN, SOLEN=1, 2, 3, 4 corresponding to the first, the second, the third and the fourth gear or speed stage. In the present embodiment, there are four speed stages from the first to the fourth, so that there are three shift points where the comparison takes place. By way of example, when the current speed stage (namely, SOLEN) is the first gear, 1→2, 1→3 and 1→4 shifts will be possible provided the actual shift operation is neglected. When the current speed stage is the second gear, 2→1, 2→3 and 2→4 will be possible while when the current speed stage is the third gear, 3→4, 3→2 and 3→1 shifts will be possible. Finally, when the current speed stage is the fourth gear, 4→3, 4→2 and 4→1 shifts will be possible. In this manner, it is possible to provide three shift points for the current speed stage (SOLEN), which are PAX1, PAX2, PAX3. In other words, of six available shift points (1→2: X1, 2→1: Y1, 2→3: X2, 3→2: Y2, 3→4: X3, 4→3: Y3), three necessary shift points (PAX1, PAX2, PAX3) can be determined for the current speed stage (SOLEN), as indicated in the Table 5 below.

TABLE 5

| Address | Current Speed Stage | | | |
|---|---|---|---|---|
| | 1st | 2nd | 3rd | 4th |
| PAX1 | X1 | Y1 | Y1 | Y1 |
| PAX2 | X2 | X2 | Y2 | Y2 |
| PAX3 | X3 | X3 | X3 | Y3 |

A change of the shift point depending on the position of the shift lever will be fixed as illustrated in FIGS. 12a and 12b (D-range and 3-range are exemplified in these Figures, respectively). When the shift lever is in its D-position, no change is made. For the 3-range, the 3→4 shift is prevented by fixing PAX3 (3→4 shift point) to a higher speed (223 km/h, for example). For 2-range, the 2→3 and 3→4 shifts are prevented by fixing PAX2 (2→3 shift point) and PAX3 (3→4 shift point) to higher speeds, as illustrated in FIG. 12c. For the L-range, 1→2, 2→3 and 3→4 shifts are prevented by fixing PAX1 (1→2 shift point), PAX2 (2→3 shift point) and PAX3 (3→4 shift point) to higher speeds, as shown in FIG. 12d. The vehicle speed (RPM) is then compared against the three shift points in order to determine a speed stage (SiFT) in accordance with the prevailing vehicle speed. Stated differently, SiFT represents a speed stage which is determined in accordance with the vehicle speed (RPM), the position of the shift lever (POSi2) and the status of the road (SLOPE). Thus, SOLEN represents a current speed stage while SiFT represents a speed stage to which a shift should be made. The combination of SOLEN and SiFT determines a particular mode of shift to be made (1→2, 2→1, 2→3, 3→2, 3→4, 4→3). When a particular shift mode is determined, an output is produced to activate the solenoids 370, 320 and 330. The interrupt operation will now be described. The purpose of the interrupt operation is to detect a slope and the termination of a slope. Initially considering the detection of a slope, an equation of motion for a running vehicle is expressed as follows:

$$T = \mu_r W + \mu_a S V^2 + \frac{\alpha}{100} W + 0.278 \frac{(W + \Delta W)}{g} \cdot \frac{dV}{dt} \quad (8)$$

where
T: the traction of a vehicle (kg)
$\mu_r$: coefficient of rolling resistance
$\mu_a$: coefficient of air resistance
W: the weight of vehicle (kg)
$\Delta W$: the equivalent weight of rotating part of the vehicle (kg)
S: the area of a front projection of the vehicle (m²)
V: vehicle speed (km/h)
dV/dt: vehicle acceleration (km/h/sec)
$\alpha$: gradient of a slope (%) ($\alpha = \sin \beta$; $\beta$ represents the inclination of the slope)

g: gravitational acceleration ($=9.8$ m/sec²)
Representing the traction during a steady-state running on a flat road by $T_0$, it follows from the equation (1) that $$T_o = \mu_r W + \mu_a S V^2 \quad (9)$$

Figure 13:
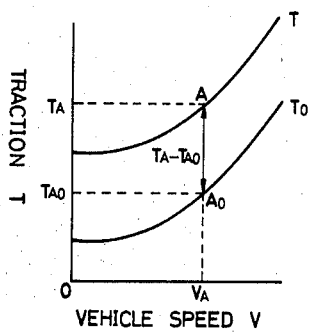
FIG. 13a graphically illustrates the relationship between a traction and a vehicle speed.
FIG. 13b graphically illustrates the relationship between the gradient of a slope and an acceleration.
Figure 13:
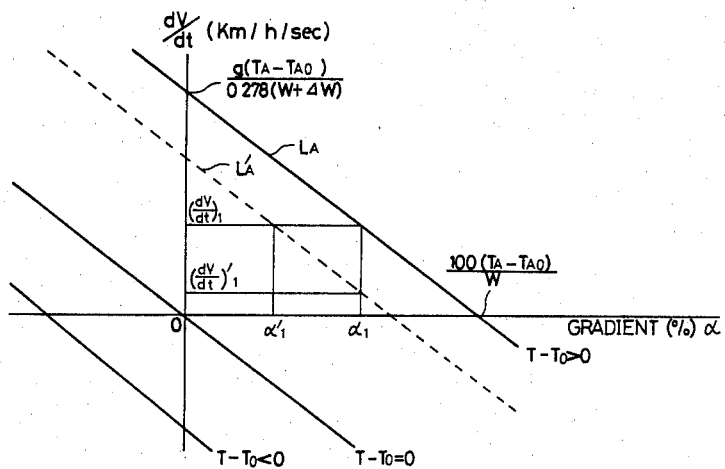

The relationship between the equations (8) and (9) can be depicted on a T-V diagram as shown in FIG. 13a. Considering a running condition A on the curve T, the prevailing vehicle speed is indicated by $V_A$ while the traction is represented by $T_A$. During a steady-state running condition, a corresponding point $A_0$ on the curve $T_0$ for the same speed $V_A$ represent a traction $T_{A0}$. The difference of traction $T_1$-$T_{A0}$ between the running conditions A and $A_0$ represents a loading on the vehicle as referenced to the steady-state running condition on the flat road, and can be derived from the equations (8) and (9) as follows:

$$T_A - T_{A0} = \frac{\alpha}{100} W + 0.278 \frac{W + \Delta W}{g} \cdot \frac{dV}{dt} \quad (10)$$

When the expression of the equation (10) is depicted on $\alpha$ versus dV/dt diagram, it is shown by a rectilinear line $L_A$ shown in FIG. 13b.

Obviously, the steady-state running condition on the flat road is indicated by the origin 0 in FIG. 13b, and any other running condition is uniquely defined on FIG. 13b.

It will be appreciated from FIG. 13b that for the running condition A, the vehicle will be accelerated with an acceleration of $g(T_A-T_{A0})/0.278(W+\Delta W)$ when it is running on the flat road. If the acceleration is zero, it will be running on a slope having the gradient of $100(T_A-T_{A0})/W$.

In a similar manner, when the road has a gradient of $\alpha_1$, the acceleration will be $$\left(\frac{dV}{dt}\right)_1.$$

However, under any running condition, the gradient of slope can be uniquely determined by detecting the traction T, the vehicle speed V and the acceleration dV/dt.

In the description given above, it has been presumed that the weight W of the vehicle is constant. However, it will be apparent from the equation (10) that the weight W is equivalent to the gradient and the acceleration dV/dt as far as a loading on the vehicle is concerned. The broken lines $L'_A$ represent an increased weight relative to the line $L_A$. If the same aceleration $$\left(\frac{dV}{dt}\right)_1$$

is detected on the lines $L_A$ and $L'_A$, the gradient $\alpha$ will assume different values $\alpha_1$, $\alpha_1'$, indicating that the vehicle is running on different slopes. If the vehicle is running on the same slope $\alpha_1$, different values of acceleration $$\left(\frac{dV}{dt}\right)_1, \left(\frac{dV}{dt}\right)'_1$$

will be detected.

Hence, in the description to follow, the weight of the vehicle will not be considered when describing the process of controlling the shift in response to the detection of a slope, but it should be understood that the slope may alternatively be interpreted as representing "the weight of vehicle" or "a combination of the slope and the weight of vehicle".

Instead of detecting the traction T, the torque on the drive axle associated with the wheels, the throttle opening, the negative pressure prevailing in the intake tube of the engine or the like may be detected.

In the following description, the detection of the throttle opening will be relied upon.

Figure 14:
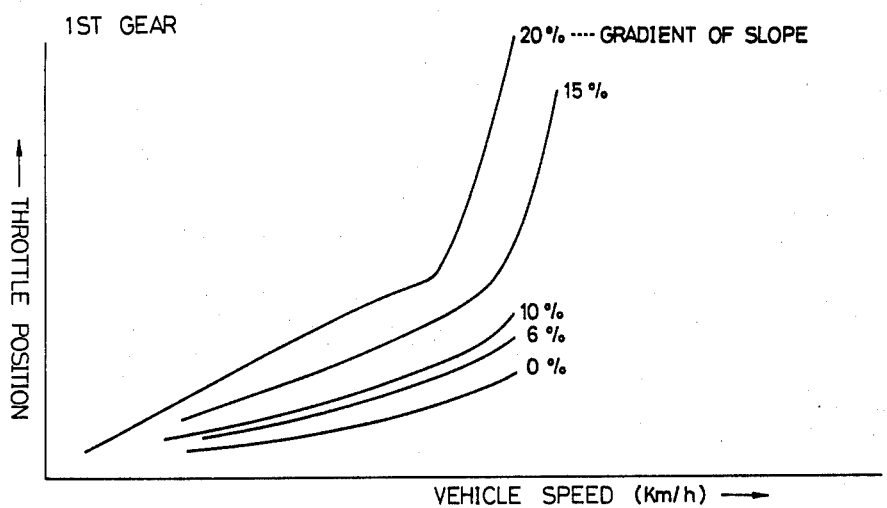
FIGS. 14a, 14b, 14c and 14d graphically illustrate the relationship between the gradient of slope and vehicle speed in each of the speed ranges.
Figure 14:
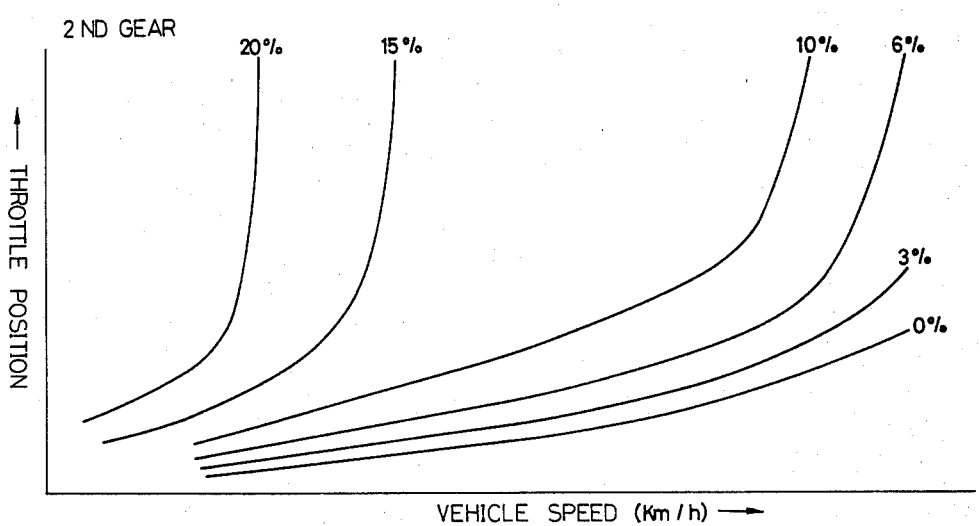

FIG. 14a graphically shows various running conditions on the first gear on a throttle opening-vehicle speed diagram, with a parameter representing the gradient of the slope for which an acceleration of zero is assumed.

In a similar manner, in the present embodiment, an up slope running region, a flat road running region (slope run-out region) and down slope running region are determined in accordance with the throttle opening and the vehicle speed as indicated in FIGS. 15a, 15b and 15c. The vehicle speeds on the higher and lower limit of each region are stored in ROM 402-1, 402-2 at addresses defined by the throttle opening, thus maintaining such vehicle speeds as reference data. A speed stage is determined from the energized or deenergized condition of the solenoids 270, 320 and 330 which detects the existence of a slope, the actual vehicle speed is compared against a low limit L1 and a high limit H1 of an up slope contained in ROM for the selected gear and the throttle opening, thus determining if the vehicle is running on a slope. In the case in which the run-out condition is detected and the slope running is terminated, it is determined if the slope detected data which is currently retained corresponds to one of SLOPE=8, 4 or 2, and a determination is made whether or not the vehicle is running on a flat road in accordance with whether the actual vehicle speed lies in a range determined by the low limit SL1 and the high limit SH1 which are contained in ROM as run-out or termination condition. When the run-out condition is met, the slope running condition (FIG. 12b, 12c or 12d) is terminated, thus returning the shift reference data to the form shown in FIG. 12a. The purpose of utilizing the ROM data to constrain the up shift between various speed ranges in accordance with the loading and in regions corresponding to the respective speed stages is to prevent a frequent up and/or down shift during the time the vehicle is running on a slope or is running under a heavy loading. Such a shift control depending on the slope and the loading assures a hunting-free running speed with an optimum acceleration and deceleration response which is compatible with the gradient of the slope and the loading on the vehicle. Consequently, a smooth and reasonable automatic shift control is achieved, enabling the elimination of drawbacks experienced in the prior art that the vehicle is decelerated even though the accelerator pedal is depressed or that a seizure of a brake is caused by a frequent use of the brake becuase of the reduced effect of the engine brake.

To prevent the occurrence of shocks when changing the shift lever from its N- to its D-position or from its N- to its R-position, the switching of the energization of the solenoid valves 320 and 330 between their N and D and N and R condition (see Table 4) is delayed by a given time interval, for example, one second, from the operation of the shift lever. Such time interval of one second can be obtained by a repetition of 0.01 second timer program stored in the ROM 402 one hundred times.

As mentioned previously, the lockup control in the second, the third and the fourth speed stage is made with reference to the tables $A_{LU}, \ldots C_{TC}$, the throttle opening and the actual vehicle speed. As mentioned previously, these tables are stored in the ROM 402 as constants data. The lockup is terminated at the throttle opening of zero, and is maintained unlocked for a given time period from immediately before to immediately after the shift operation. An unlock pre-constraint period before a shift operation, namely, a period of time from the termination of the lockup to a shift operation, as well as an unlock post-constraint period after the shift operation, namely, a period of time from the completion of the shift operation to the initiation of determining the necessity of the lockup are previously established as illustrated in FIGS. 16a to 16d and fixedly stored in the ROM 402 using the throttle openings and the variations of the throttle openings as addresses. When a shift operation is necessary, a throttle opening is stored in the RAM 403 or an internal RAM of the CPU 401, and subsequently a throttle opening which prevails 0.1 second later is obtained, from which the stored value of the throttle opening is subtracted to derive a variation of the throttle opening which is then stored in the RAM 403 or the internal RAM of the CPU 401. The current value of the throttle opening is used as an address to access the ROM 402 to read out the data illustrated in FIG. 16a. Then the variation of the throttle opening is used as an address to access the ROM 402 to read out the data illustrated in FIG. 16b. The values read out from the ROM 402 are added together to define a time limit. By repeating a 0.01 second time limit program, until the time limit is reached, whereupon the shift operation is performed. After the shift operation, the values of the throttle opening and the variation of throttle opening are obtained in the similar manner as mentioned before to access the ROM 402 to read out the data illustrated in FIGS. 16c and 16d. The values read out are added together to establish a time limit, and when the time limit is exceeded, the lockup control in the newly established speed stage is initiated. By determining the unlock pre- and post-constraint periods in terms of the throttle openings and the variations thereof, the shocks which are experienced during a shift operation or when the lockup operation is entered can be reduced.

The overall operation of the described embodiment will now be described with reference to flow charts. First of all, data fixedly stored in the ROM 402 which are accessed in the described operations is summarized below. Areas in the memory where the individual data are stored are referred to as tables or fixed registers for the convenience of the description as indicated in Table 6 below.

TABLE 6

Figure 1:
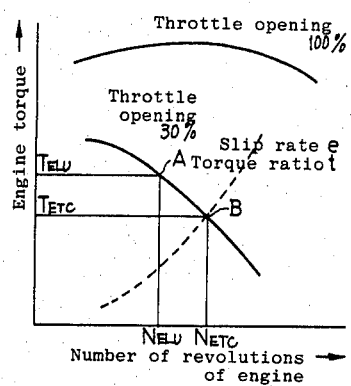
FIG. 1 graphically shows the relationship between an engine torque and the number of revolutions of the engine.
Figure 2:
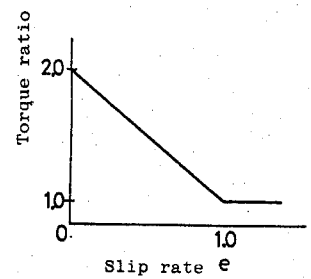
FIG. 2 graphically shows the relationship between the slip rate and the torque ratio of a torque converter.
Figure 3:
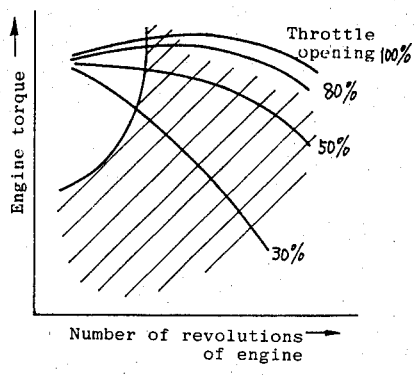
FIG. 3 graphically illustrates a region determined by both the number of revolutions and the torque of the engine which is appropriate to activate the lockup.
Figure 4A:
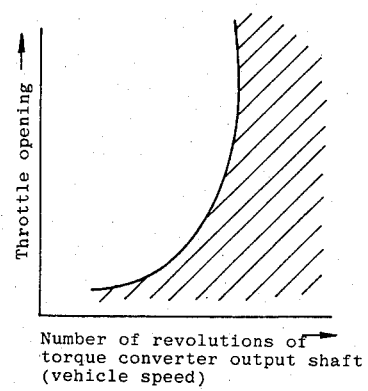
FIG. 4a graphically illustrates a region appropriate for the lockup operation as illustrated in FIG. 3 as a function of the number of revolutions of the output shaft of the torque converter and the throttle opening.
Figure 4:
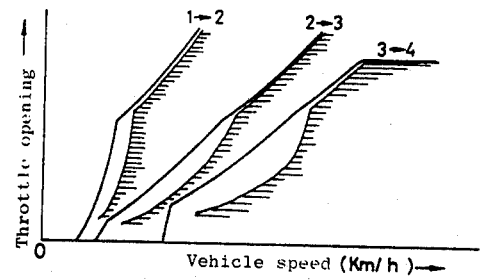
FIG. 4b graphically illustrates regions appropriate for the lockup operation which are determined in accordance with a vehicle speed, a throttle opening and a speed stage.
FIG. 4c graphically illustrates quantized boundaries to establish and terminate the lockup operation in order to assure that the lockup operation be performed in only those regions where the lockup operation is appropriate.
Figure 4:
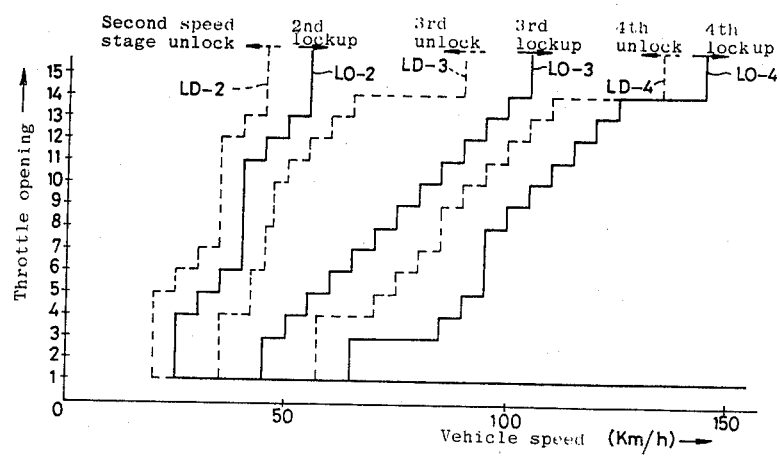

| Memory Area No. of ROM 402 | Table or Fixed Register | Stored Content in ROM 402 |
|---|---|---|
| 1 | Table $A_{LU}$ | minimum vehicle speed to activate the lockup in the second speed stage (LO-2 in FIG. 4c) |
| 2 | Table $A_{TC}$ | maximum speed to terminate lockup in the second speed stage |

TABLE 6-continued

Figure 16:
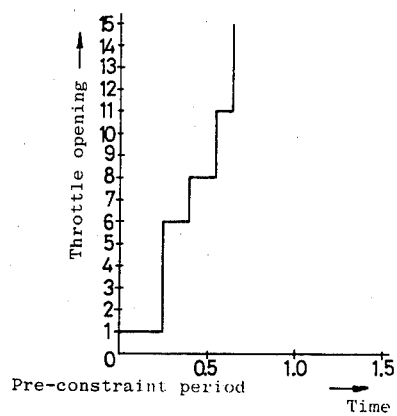
FIG. 16a graphically shows a pre-constraint period from the termination of the lockup until a shift operation is enabled as a function of a throttle opening.
FIG. 16b graphically shows the pre-constraint period as a function of a variation or an acceleration of the throttle opening.
FIG. 16c graphically shows a post-constraint period from the shift operation until the lockup operation is enabled as a function of a throttle opening.
FIG. 16d graphically shows the post-constraint period as a function of a variation or an acceleration of the throttle opening.
Figure 16:
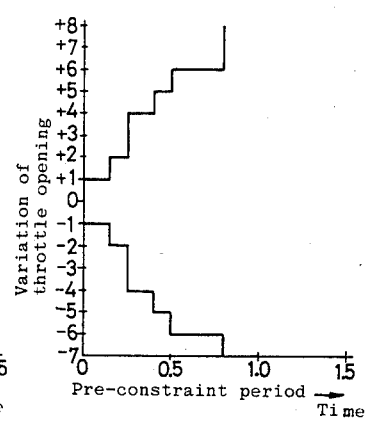
Figure 16:
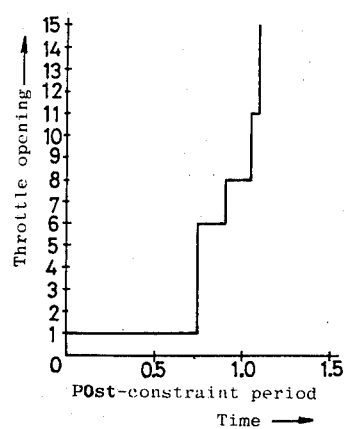
Figure 16:
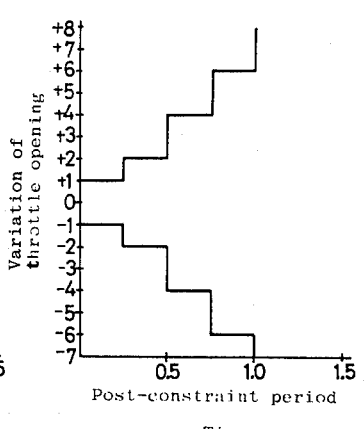

| Memory Area No. of ROM 402 | Table or Fixed Register | Stored Content in ROM 402 |
|---|---|---|
| | | (LD-2 in FIG. 4c) |
| 3 | Table $B_{LU}$ | minimum vehicle speed to activate the lockup in the third speed stage (LO-3 in FIG. 4c) |
| 4 | Table $B_{TC}$ | maximum vehicle speed to terminate the lockup in the third speed stage (LD-3 in FIG. 4c) |
| 5 | Table $C_{LU}$ | minimum vehicle speed to activate the lockup in the fourth speed stage (LO-4 in FIG. 4c) |
| 6 | Table $C_{TC}$ | maximum vehicle speed to terminate the lockup in the fourth speed stage (LD-4 in FIG. 4c) |
| 7 | Table $D_1$ | minimum vehicle speed to shift from the first to the second speed stage (PD-001 in FIG. 12a) |
| 8 | Table $D_2$ | maximum vehicle speed to shift from the second to the first speed stage (PD-002 in FIG. 12a) |
| 9 | Table $D_3$ | minimum vehicle speed to shift from the second to the third speed stage (PD-003 in FIG. 12a) |
| 10 | Table $D_3$ | minimum vehicle speed to shift from the second to the third speed stage (PD-003 in FIG. 12a) |
| 11 | Table $D_5$ | minimum vehicle speed to shift from the third to the fourth speed stage (PD-005 in FIG. 12a) |
| 12 | Table $D_6$ | maximum vehicle speed to shift from the fourth to the third speed stage (PD-006 in FIG. 12a) |
| 13 | Table $E_1$ | minimum vehicle speed for SLOPE 2 (L1 in FIG. 15a) |
| 14A | Table $E_2$ | minimum vehicle speed to terminate SLOPE 2 (SL1 in FIG. 15a) |
| 14B | Table $F_1$ | minimum vehicle speed for SLOPE 4 (L1 in FIG. 15b) |
| 15 | Table $F_2$ | minimum vehicle speed to terminate SLOPE 4 (SL1 in FIG. 15b) |
| 16 | Table $G_1$ | minimum vehicle speed for SLOPE 8 (L1 in FIG. 15c) |
| 17 | Table $G_2$ | minimum vehicle speed to terminate SLOPE 8 (SL1 in FIG. 15c) |
| 18 | Fixed Register $H_1$ | vehicle speed to constrain 1→2 shift (PD-001 in FIG. 12d) |
| 19 | Fixed Register $H_2$ | vehicle speed to constrain 2→1 shift (PD-002 in FIG. 12d) |
| 20 | Fixed Register $H_3$ | vehicle speed to constrain 2→3 shift (PD-003 in FIG. 12d) |
| 21 | Fixed Register $H_4$ | vehicle speed to constrain 3→2 shift (PD-004 in FIG 12d) |
| 22 | Fixed Register $H_5$ | vehicle speed to constrain 3→4 shift (PD-005 in FIG. 12d) |
| 23 | Fixed Register $H_6$ | vehicle speed to constrain 4→3 shift (PD-006 in FIG. 12d) |
| 24 | Fixed Register J | time limit to prevent shocks during N→D and N→R (data 100 indicative of a repetition of 0.01 second program timer one hundred times) |
| 25 | Table $K_a$ | time limit of FIG. 16a (number of times 0.01 second program timer is repeated) |
| 26 | Table $K_b$ | time limit of FIG. 16b (same as above) |
| 27 | Table $K_c$ | time limit of FIG. 16c (same as above) |
| 28 | Table $K_d$ | time limit of FIG. 16d (same as above) |

Similarly, areas of the RAM 403 or the internal RAM of CPU 401 which store temporary data are referred to as tables or registers for the convenience of description, and store these data in the manner as shown in Table 7 below. In actuality, different data may be temporarily stored in the RAM 403 or the internal RAM of the CPU 401 at a given single address in a time sequence, and hence it should be noted that each memory area is not assigned to the storage of a single or one set of data alone as indicated in the Table 7. In other words, an address or a group of addresses may be utilized by different tables or registers in the time sequence.

TABLE 7

Content stored in RAM 403 or internal RAM of CPU 401

| Register No. | Register | Stored Content |
|---|---|---|
| 1 | THRO register 2 | throttle opening of previous interrupt |
| 2 | THRO register 1 | throttle opening of current interrupt |
| 3 | vehicle speed register 2 | previous vehicle speed |
| 4 | vehicle speed register 1 | current vehicle speed |
| 5 | POS register 2 | shift lever position of a previous interrupt |
| 6 | POS register 1 | shift lever position of current interrupt |
| 7 | SOL1 register | energization "1" or deenergization "0" of shift controlling solenoid valve 320 |
| 8 | SOL2 register | energization "1" or deenergization "0" of shift controlling solenoid valve 330 |
| 9 | SOL3 register | energization "1" or deenergization "0" of lockup control solenoid valve 370 ("1" represents the lockup activated.) |
| 10 | timer register N | number of times a unit program timer read from fixed register J of ROM 402 is repeated |
| 11 | register $K_a$ | time limit read from table $K_a$ of ROM 402 |
| 12 | register $K_b$ | time limit read from table $K_b$ of ROM 402 |
| 13 | register $K_c$ | time limit read from table $K_c$ of ROM 402 |
| 14 | register $K_d$ | time limit read from table $K_d$ of ROM 402 |
| 15 | timer register B | sum of data from registers $K_a$ and $K_b$ |
| 16 | timer register A | sum of data from registers $K_c$ and $K_d$ |
| 17 | SHIFT register | current speed stage |
| 18 | SLOPE register | stage such as SLOPE 2, 4, 8 |
| 19 | RAM table $D_1$ | PD-001 |
| 20 | RAM table $D_2$ | PD-002 |
| 21 | RAM table $D_3$ | PD-003 |
| 22 | RAM table $D_4$ | PD-004 |
| 23 | RAM table $D_5$ | PD-005 |
| 24 | RAM table $D_6$ | PD-006 |

FIGS. 17a to 17d indicate operational sequences of an automatic shift control and an automatic lockup control by the electronic digital control system 400 with reference to the tables and registers shown in Tables 6 and 7. FIGS. 17e and 17f indicate the operational sequences of an automatic slope detection and a slope termination detection which are performed through an interrupt operation. The operation of the digital control system 400 will now be described with reference to these Figures.

Figure 17:
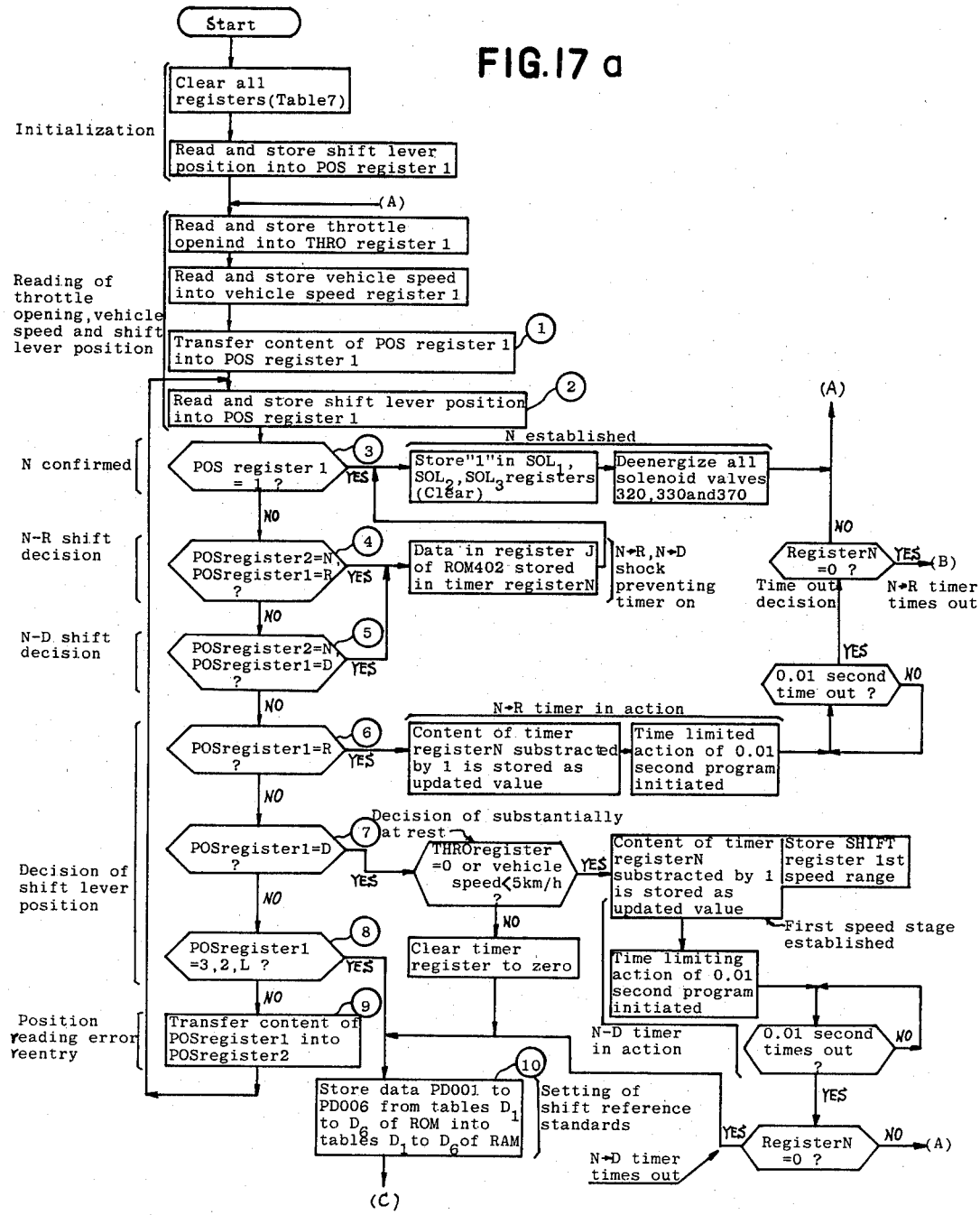
FIGS. 17a, 17b, 17c and 17d are a plurality of flow charts indicating a decision to shift, the control of a shift operation, a lockup decision and the control of the lockup operation performed by the electronic digital control system based upon controlling program data fixedly stored in a read-only memory.
FIGS. 17e and 17f are flow charts indicating the detection of a slope and of the termination of the slope performed by the electronic digital control system based upon an interrupt program data fixedly stored in the read-only memory.
Figure 17:
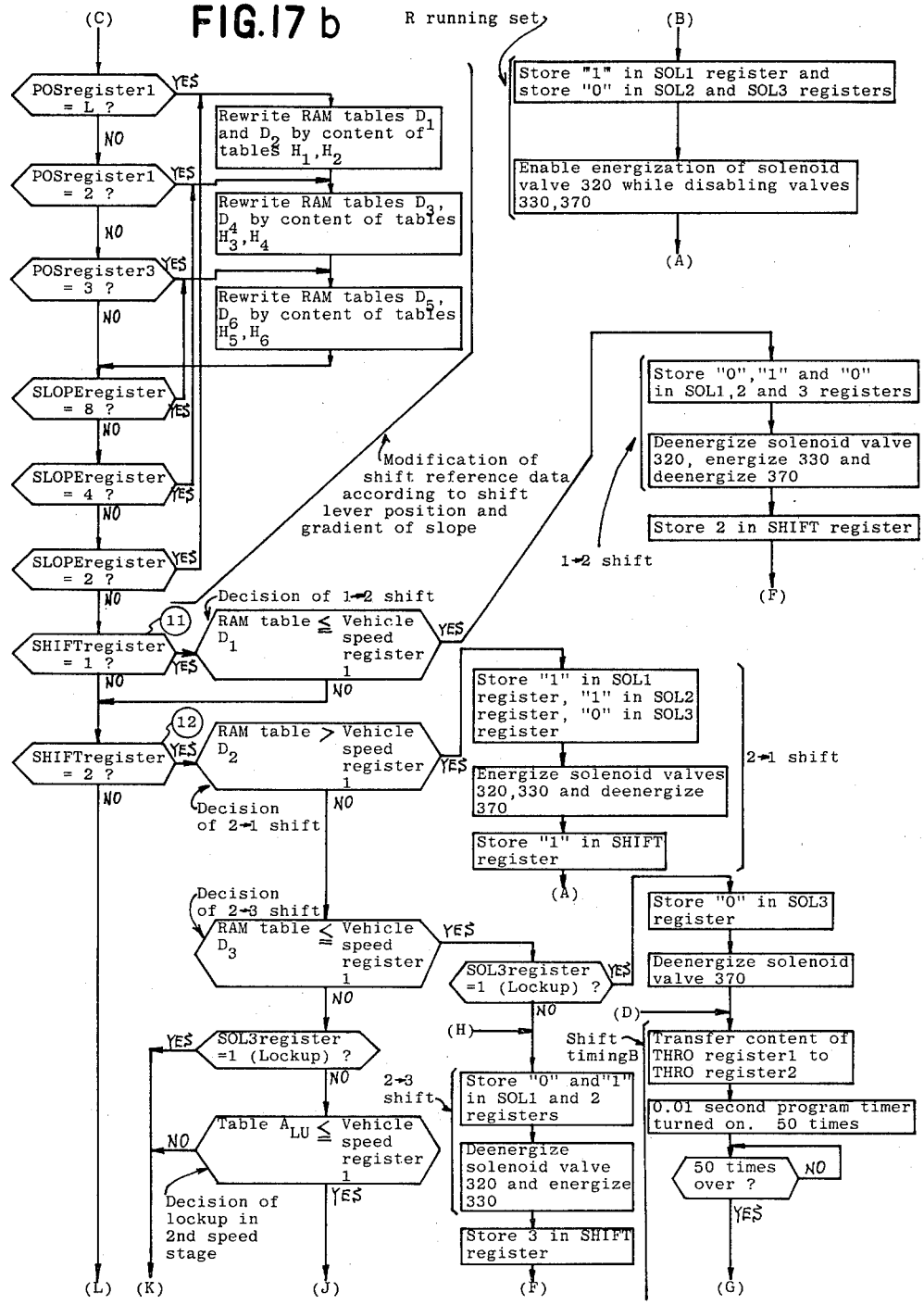
Figure 17:
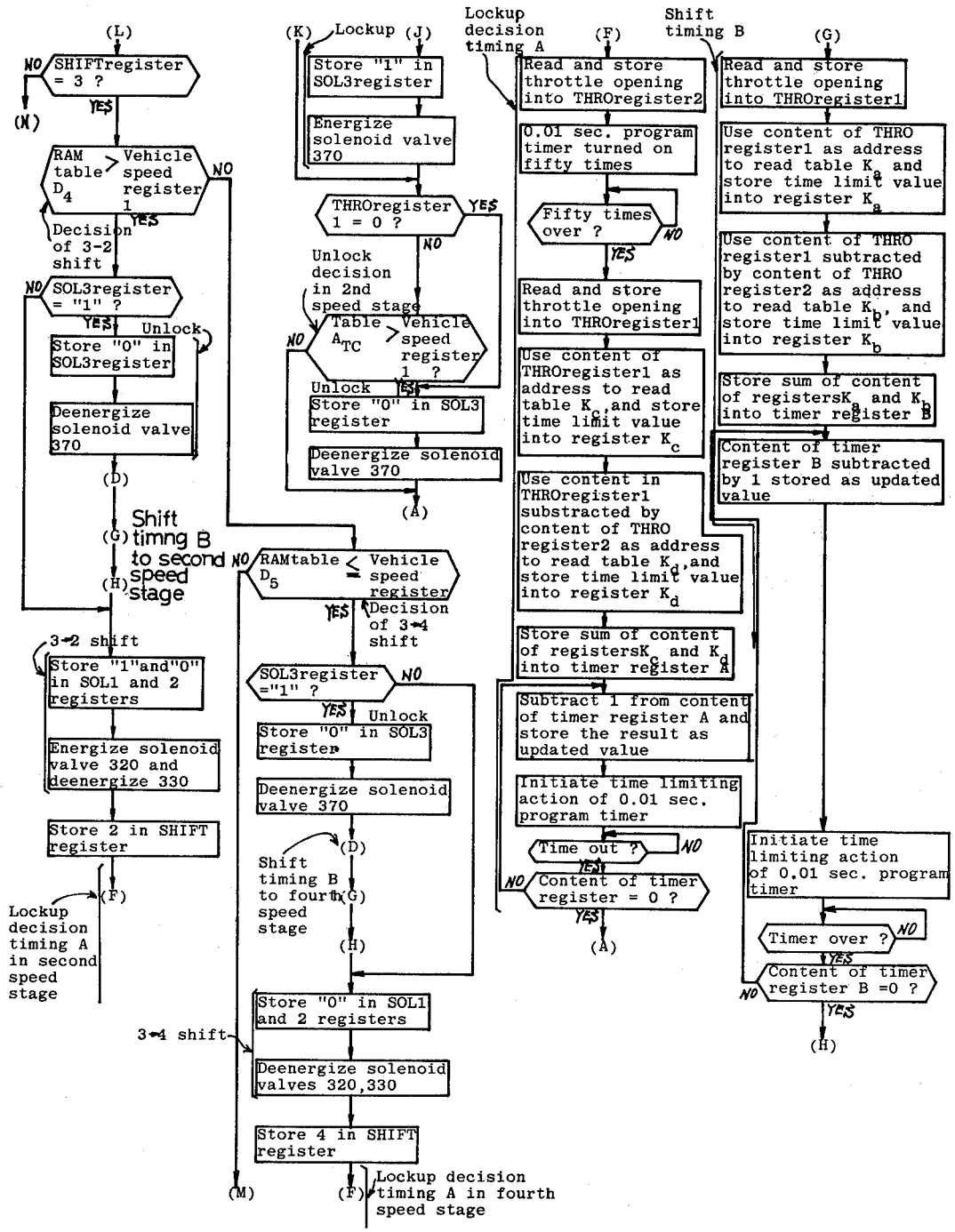
Figure 17D:
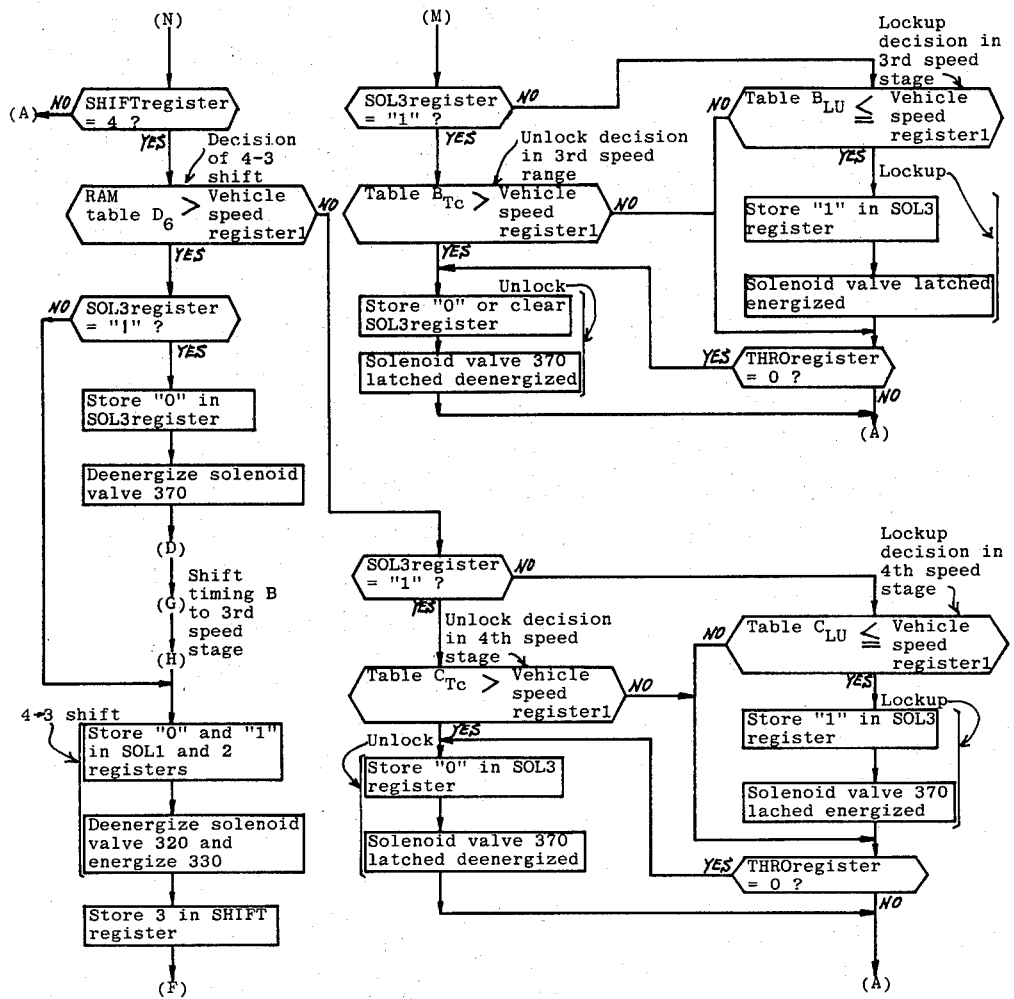
Figure 17:
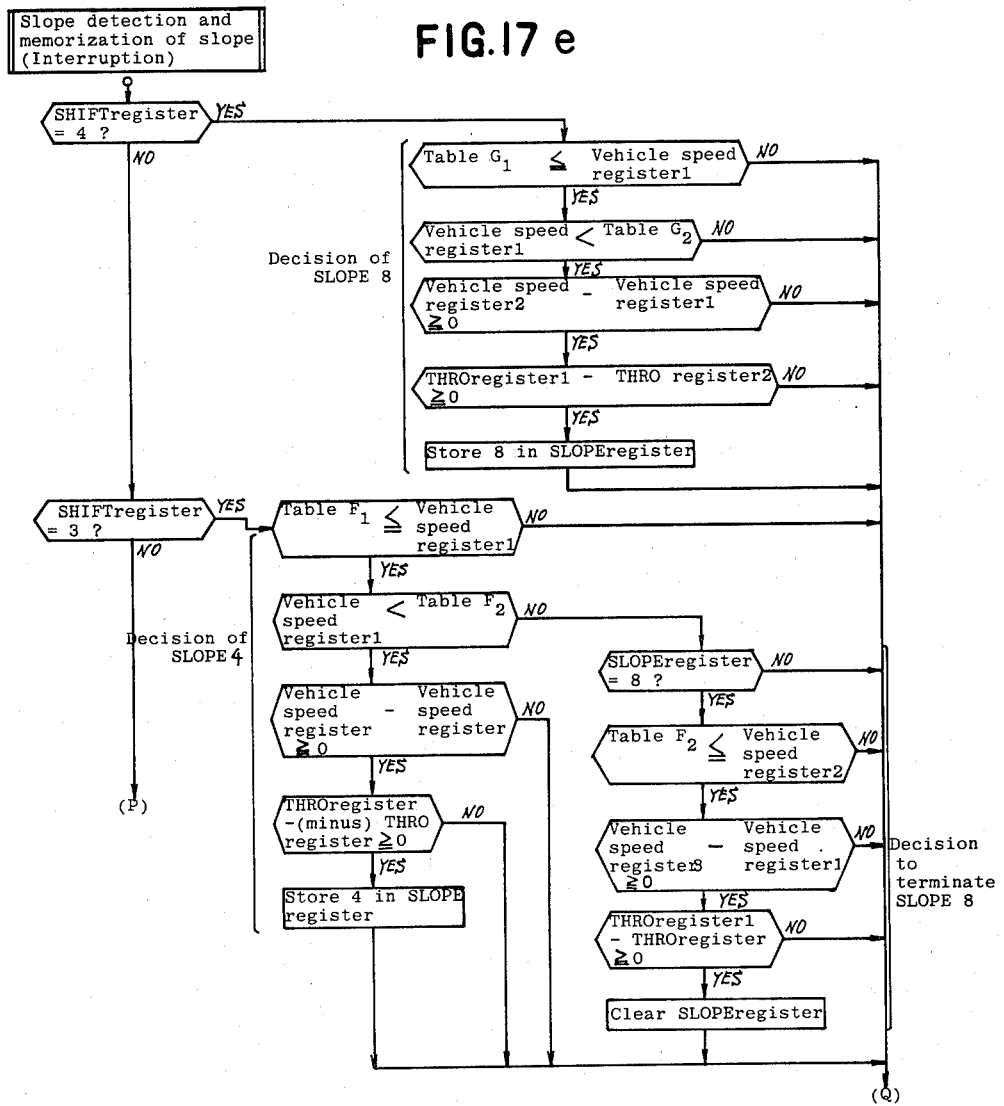
Figure 17:
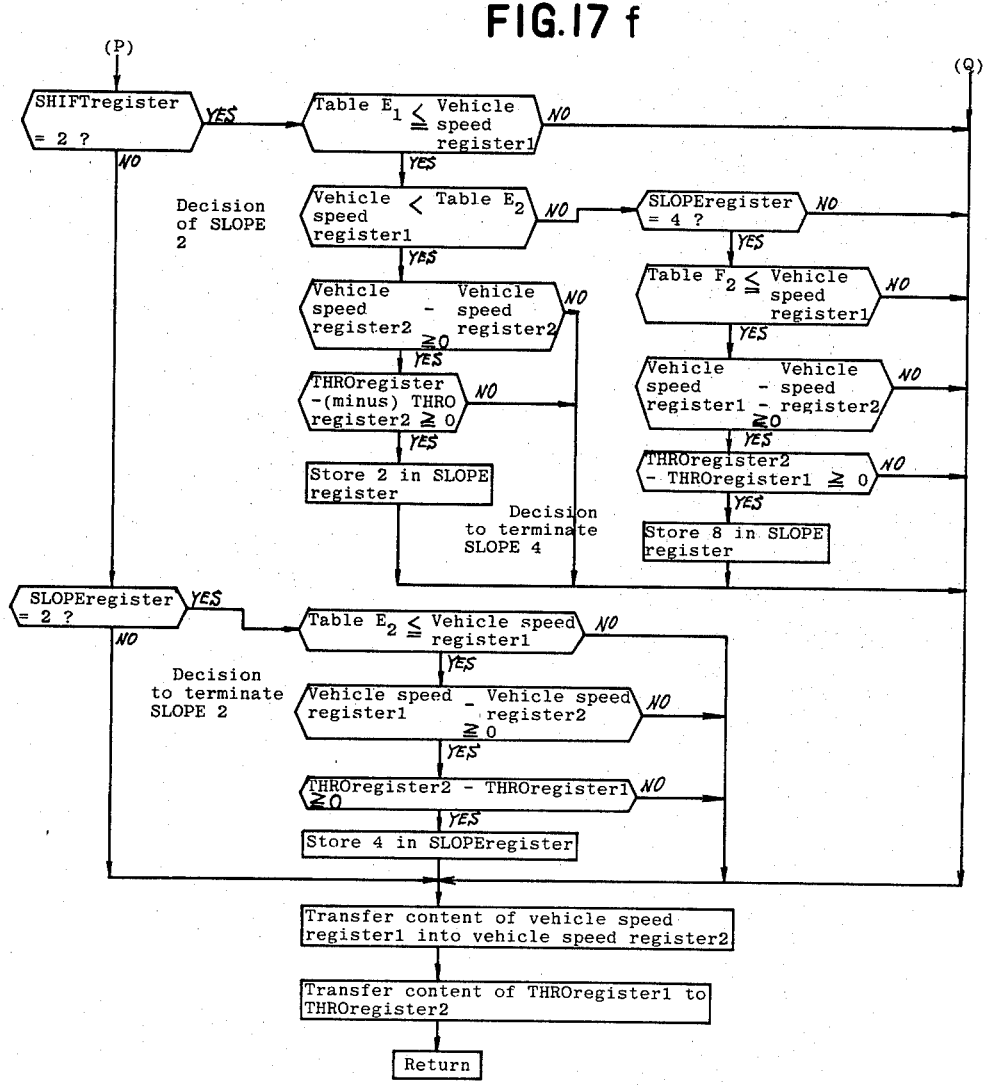

As the digital control system 400 is turned on in response to the insertion of an ignition key, the system 400 sequentially turns on the devices and the circuits which are to be controlled by the system in accordance with a power on sequence program data fixedly stored in the ROM 402 (START in FIG. 17a). All the tables and the registers shown in the Table 7 are cleared. The initialization then takes place by reading the shift lever position and storing it in POS register 1 (initialization of FIG. 17a). The flow chart sequence is started, beginning with A. The throttle opening and the vehicle speed are read and are stored in the THRO register and the vehicle speed register 1. In order to detect a change in the lever position from that position (N: neutral) which is stored in the POS register 1 previously, the content of the POS register 1 is transferred to the POS register 2, and the shift lever position is read and stored in the POS register 1.

(a): If the content of the POS register 1 remains N upon examination, it means that a vehicle drive setup (a change in the shift lever position) has not yet been made. Accordingly, the SOL 1 register, SOL2 register and SOL4 register are all cleared, deenergizing the solenoid valves 320, 330 and 370. As mentioned previously, these registers have been already cleared immediately after the insertion of the ignition key and the solenoid valves 320, 330 and 370 are deenergized, eliminating the need to clear them again. However, the clearing operation is significant in that the N-condition is established whenever a shift to the N-position occurs from another shift lever position.

(b): If the POS register 1 stores R and the POS register 2 stores N (step 4=YES), this means that an N→R shift occurred for the shift lever. Hence, to prevent the occurrence of shocks, the shock preventing time limit stored in the ROM register J is fed to the timer register N. Then the procedure returns to A in order to establish the N-condition. In steps 1 and 2, R is stored in the POS1 and POS2 registers. Subsequently, the procedure proceeds through the steps 3, 4 and 5 and produces YES at the step 6, whereupon the content of the timer register N from which 1 is subtracted is stored in the memory as an updated value (count down). 0.01 second timer program is executed and when it times out, the steps A and 1 to 6 are repeated to count down the timer register N and to execute the 0.01 second timer program unless the content of the timer register N is equal to 0 (time out). The similar process is subsequently repeated. When the content of the timer register N is equal to 0, the time interval which is required to prevent the occurrence of shocks has passed, so that the procedure advances to B where R running is set (B-A in FIG. 17b). If the shift lever position changes before the time limit is reached, the N-condition is always passed, thus repeating the process (a).

(c): If the POS register 1 store D and the POS register 2 stores N (step 5=YES), this means that a N-D shift occurred for the shift lever. Hence, to prevent the occurrence of shocks, the shock preventing time limit from the ROM register J is stored in the time register N. The procedure returns to A in order to establish the N-condition. In steps 1 and 2, the POS1 and POS2 registers both store D, whereby the steps 3 to 6 are passed to produce YES at the step 7. A determination is made if the vehicle is substantially at rest, and if it is at rest, the shift register stores 1 indicative of the first speed stage, and the time limit operation to prevent the occurrence of shocks is initiated. When it times out, the procedure advances to the step 10. If the vehicle is not substantially at rest or it ceases to be at rest, it is unnecessary to initiate or continue the time limit function since no shock can be produced, thus advancing to the step 10.

(d): If the shift lever is in its 3, 2 or L-position, no counting operation for the time limit takes place, and the procedure advances to the step 10.

(e): The shift lever position should be detected in either one of the steps 3, 6, 7 and 8, but in consideration of the situation that a wrong reading of the shift lever may occur, the arrangement is such that the procedure is routed through the step 9 to return to the step 2 if the shift lever position is not detected in the steps 3 and 6 to 8.

The above description covers the detection of a shift lever position and a corresponding set-up.

In the step 10, automatic shift reference data for the flat road, namely, the standard data is read from the tables $D_1$ to $D_6$ of the ROM, and is written into the RAM tables $D_1$ to $D_6$. The data in the RAM tables $D_1$ to $D_6$ is rewritten in accordance with the shift lever position and the gradient of a slope (SLOPE 2, 4, 8) (see FIG. 17b). Stated differently, the standard data shown in FIG. 12a is rewritten into such data as illustrated in FIG. 12b, 12c or 12d. No rewriting operation takes place when the shift lever is at its D-position and the vehicle is running on a flat road. SLOPE register has stored the gradient of a slope therein in the process of detecting the slope and the termination of the slope which is achieved by an interrupt operation. The rewriting operation is performed with reference to the data stored in the SLOPE register.

An automatic shift control takes place with reference to the RAM tables $D_1$ to $D_6$ and the SHIFT register in which data is entered in the manner mentioned above. An automatic lockup control takes place with reference to the tables $A_{LU}$, $A_{TC}$, $B_{LU}$, $B_{TC}$, $C_{LU}$ and $C_{TC}$ as well as the data stored in the SHIFT register. The operational sequence for these controls is illustrated in FIG. 17b starting with the step 11.

(f): Assuming that the vehicle is running in the first speed stage (step 11=YES), the throttle opening (data stored in THRO register 1) is used as an address to access the RAM table $D_1$ to read out a vehicle speed to determine if the actual vehicle speed (data stored in the vehicle speed register 1) exceeds it (step 12). If the answer is YES, SOL1 to SOL3 registers and the solenoid valves are set in a manner corresponding to the second speed stage while 2 indicative of the second speed stage is stored in the SHIFT register as an updated data. While no lockup takes place in the first speed stage, there is a possibility for the lockup to be activated in the second speed stage. Accordingly, after the time limit of the lockup decision timing A illustrated in FIG. 17c, starting with F (the minimum time interval after the shift to the second speed stage until the lockup takes place), the procedure returns to A. After returning to A, the procedure advances through the steps 1 to 11 to produce YES at the step 12 where a decision is rendered to or not to activate the lockup. Since the time limit has passed, step 12=YES is followed by a decision "to activate the lockup". When the lockup operation takes place (SLO3 register="1", solenoid valve 370 energized), no shocks will be produced in all probabilities.

(g): When the vehicle is running in the second speed stage (step 12=YES), the data stored in the THRO register 1 is used as an address to read out the vehicle speed from the RAM table $D_2$, and it is determined if the vehicle speed stored in the vehicle speed register 1 is less than this value, or if it is necessary to effect a shift to the first speed stage. If this is true, a 2→1 shift takes place accompanied by storing 1 in the SHIFT register, followed by returning to A. If the vehicle speed of the vehicle speed register 1 is greater than the vehicle speed from the RAM table $D_2$, the vehicle speed is read from the RAM table $D_3$, and it is determined whether the vehicle speed of the vehicle speed register 1 is greater than this value, or if it is necessary to effect a shift to the third speed stage. If it is determined that a shift to the third speed stage is necessary, the SOL3 register is examined if it stores "1" or the lockup condition, and if it stores "1", the SOL register 3 is cleared, and "0" is stored therein instead, thus unlocking. Subsequently, the time limiting operation for the shift timing B follows. During the shift timing B (D-G in FIG. 17b and G-H in FIG. 17c), a variation in the throttle opening which occurs during 0.5 second (a repetition of 0.01 second timer fifty times) is obtained as a variation of the throttle opening, which is used as an address to read the time limit from the table $K_b$. Data stored in the THRO register 1 is used as an address to read the time limit from the table $K_a$. The sum of both values is stored in the timer register B, and the 0.01 second timer program is repeated a number of times which is indicated by data stored in the register B. In this manner, a time delay is provided to prevent the occurrence of shocks from the unlock operation until a 2-3 shift takes place which depends on the throttle opening and the variation thereof. When the shift timing is reached, a shift to the third speed range occurs and 3 is stored in the SHIFT register as shown at H-F of FIG. 17b. The procedure then returns to A with a lockup decision timing A in order to prevent an immediate lockup operation in the third speed stage. The lockup decision timing A is performed in the same manner as the shift timing B, with the time limit which depends on the throttle value and the variation thereof being derived from the tables $K_c$ and $K_d$. When a shift to the third speed stage is unnecessary, the SOL3 register is initially examined if it stores "138 or the lockup condition, and when the answer is NO, the throttle opening (data stored in the THRO register 1) is used as an address to read the vehicle speed from the table $A_{LU}$, and it is determined whether the vehicle speed from the vehicle speed register 1 exceeds it. If it exceeds the latter, the necessity of the lockup operation is determined, whereby the procedure advances to J in FIG. 17c where "1" is stored in the SOL3 register enabling the solenoid valve 370 to be energized for the lockup operation. However, if the lockup is already completed, the throttle opening stored in the THRO register 1 is examined to see if it is 0, and if it is 0, the lockup is terminated to prevent the occurrence of shocks. When the throttle opening is not equal to 0, the data stored in the THRO register 1 is used as an address to read the vehicle speed from the table $A_{TC}$ and it is determined whether the vehicle speed from the vehicle speed register 1 is less than the latter in order to decide whether the vehicle speed is out of the lockup region. When the vehicle speed from the vehicle speed register 1 is less than the value from the table $A_{TC}$, the lockup is terminated. On the contrary, if it is not less than the latter, the lockup may be continued, thus returning to A.

(h): The shift decision control and the lockup decision control during the time when the vehicle is running in the third speed stage are similar to those described under Paragraph (g) in connection with the second speed stage. However, in the third speed stage, the RAM tables $D_4$ and $D_5$ are referenced for the decision of 3→2 and 3→4 shifts while the tables $B_{LU}$ and $B_{TC}$ are referenced in the lockup decision and the unlock decision, respectively. (see FIG. 17c, beginning with L and continuing to M to A in FIG. 17d)

(i): When the vehicle is running in the fourth speed stage, the procedure is substantially similar to that mentioned above under the Paragraph (g) in connection with the second speed stage. The RAM table $D_6$ is referred to in the decision of 4→3 shift. There is no shift to an upper speed stage and therefore no decision to such shift. The tables $C_{LU}$ and $C_{TC}$ are referred to in the lockup decision and in the unlock decision, respectively.

FIGS. 17e and 17f illustrate a flow chart in which an interrupt operation is utilized to detect a slope and the termination of a slope and in which the gradient of a slope data is stored in SLOPE register. Reference to FIGS. 15a to 15e will facilitate the understanding of such operation.

(j): Initially, when the vehicle is running in the fourth speed stage (see FIG. 15c), a decision is made that no acceleration of the vehicle takes place despite the accelerator pedal is depressed (namely, meaning an increased load on the vehicle or running on a slope) and 8 is stored in the SLOPE register if the vehicle speed is between L1 (table $G_1$) and SL1 (table $G_2$), the vehicle speed during the previous interrupt is greater than or equal to the vehicle speed during the current interrupt and the throttle opening during the current interrupt is not less than the throttle opening during the previous interrupt or no acceleration of the vehicle is occurring.

(k): When the vehicle is running in the third speed stage (see FIGS. 15c and 15b), a decision for the SLOPE 4 is made in the same manner as mentioned under Paragraph (j), and it is also determined whether SLOPE 8 established under (j) is to be terminated. While the decision for the SLOPE 4 occurs in the same manner as under Paragraph (j), the decision is made with reference to the tables $F_1$ and $F_2$. The SLOPE 8 is terminated or the SLOPE register 8 is cleared if the vehicle speed is greater than SL1 (table $G_2$) of FIG. 15c, the vehicle speed during the current interrupt is greater than or equal to the vehicle speed during the current interrupt is less than or equal to the throttle opening during the previous interrupt, whereupon a determination is made that the vehicle is running on a slope.

(l): When the vehicle is running in the second speed stage (see FIGS. 15a and 15b), the decision for the SLOPE 2 and the decision to terminate the SLOPE 4 are made in the same manner as mentioned under Paragraph (k). However, the tables $E_1$ and $E_2$ are referenced during the decision for the SLOPE 2. When the decision to terminate SLOPE 4 is rendered, 8 is stored in the SLOPE register. SLOPE 2 is terminated when the vehicle is running in the first speed stage by a procedure which is similar to that mentioned under Paragraph (k). At the end of the slope detecting and termination detecting flow, the vehicle speed and the throttle opening during the current interrupt are stored in the vehicle speed register 2 and the THRO register 2, respectively.

From the foregoing description, it will be appreciated that according to the invention, regions where the lockup is preferred are previously stored in the memory for the second and the third speed stage as well as the fourth speed stage, and the lockup and the unlock are automatically achieved with reference to the memory, whereby the fuel cost is improved and the useful life of the torque converter is increased. Since the capability of the vehicle having a directly coupled clutch are fully utilized, the vehicle can be operated in a highly economical manner.

In addition, since the lockup is automatically terminated whenever the accelerator pedal is released, the application of shocks to the automatic transmission or the engine is minimized, and no fluctuation in the vehicle speed is induced.

Finally, the lockup is always terminated during a shift operation, so that shocks and fluctuation in the vehicle speed are prevented, enabling a smooth shift operation.

Having now fully set forth both structure and operation of preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. A lockup controlling system for an automatic, variable speed transmission including a directly coupled clutch and a hydraulic circuit including a fluid path switching means and solenoid valve means which causes the engagement and disengagement of the directly coupled clutch comprising:
    first means for sensing an operating condition of the transmission and for producing a first signal in accordance therewith;
    second means for sensing an operating condition of an engine to which the transmission is coupled and for producing a second signal in accordance therewith;
    solenoid driver means for selectively energizing or deenergizing the solenoid valve means in response to a solenoid control signal; and
    electronic control means including means for storing reference data in the form of one of the operating condition of the transmission and the operating condition of the engine, addressed by the form of the other of the operating condition of the transmission and the operating condition of the engine, and indicative of boundaries between regions where a lockup operation of the transmission is advantageous and regions where the lockup is advantageously terminated, said reference data being provided for a plurality of speed stages; means for reading said first and second signals; means for reading out reference data addressed by one of said first and second signals and comparing the other of said first and second signals with the read-out reference data to provide a solenoid control signal for energizing or deenergizing the solenoid valve means.

2. A lockup control system according to claim 1 in which the included reference data corresponds to each of the speed stages other than the first speed stage and wherein the electronic control means executes the lockup control when the vehicle is running in a speed stage higher than the first speed stage.

3. A lockup control system according to claim 1 in which said first means includes a vehicle speed signal generator means connected to output shaft of the transmission and a digital data generator means for generating digital speed data in accordance with the output of the vehicle speed signal generator means.

4. A lockup control system according to claim 3 in which said second means is a throttle opening sensor connected to the throttle valve of the engine.

5. A lockup control system according to claim 4 in which the included reference data is in the form of the vehicle speed addressed by the form of throttle opening and the electronic control means reads the vehicle speed and the throttle opening by said first and second means, reads out reference data addressed by the throttle opening, compares the vehicle speed with the read-out reference data, and provides a solenoid control signal for energizing or deenergizing the solenoid valve means.

6. A lockup control system according to claim 1 in which the electronic control means detects a virtual release of an accelerator pedal and sets up the solenoid valve means in a manner corresponding to the termination of a lockup in response to the detection of the release of the accelerator pedal.

7. A lockup control system according to claim 6 in which said second means is a throttle opening sensor connected to the throttle valve of the engine and the electronic control means detects virtual release of the accelerator pedal by detecting a substantially zero throttle opening.

8. A lockup control system according to claim 1 in which the electronic control means sets up said solenoid valve means in a manner corresponding to the termination of a lockup immediately before a shift of the speed stage.

9. A lockup control system according to claim 8 in which the electronic control means maintains the termination of the lockup for a given time interval after a shift of the speed stage.

10. A lockup control system for an automatic, variable speed transmission including a directly coupled clutch and a hydraulic circuit including fluid path switching means, speed stage control valve means and lockup control valve means comprising:
    first means for sensing an operating condition of the transmission and for producing a first signal in accordance therewith;
    second means for sensing an operating condition of an engine to which the transmission is coupled for producing a second signal in accordance therewith;
    first solenoid driver means for selectively energizing or deenergizing said speed stage control valve means in response to a speed stage control signal;
    second solenoid driver means for selectively energizing or deenergizing said lockup control valve means in response to a lockup control signal; and
    electronic control means including means for storing first reference data in the form of one of the operating condition of the transmission and the operating condition of the engine addressed by the form of the other of the operating condition of the transmission and the operating condition of the engine and indicative of boundaries between speed stage regions as well as second reference data in the form of the operating condition of the transmission and the operating condition of the engine addressed by the form of the other of the operating condition of the transmission and the operating condition of the engine and indicative of boundaries between regions where a lockup operation of the transmission is advantageous and regions where the lockup is advantageously terminated, said first and second reference data being provided for a plurality of speed stages; means for reading said first and second signals; means for reading out said first reference data addressed by one of said first and second signals, comparing the other of said first and second signals with the read-out first reference data, and means for producing a speed stage control signal for energizing or deenergizing the speed stage control valve means; means for reading out said second reference data addressed by one of said first and second signals, comparing the other of said first and second signals with the read-out second reference data and means for producing a lockup control signal for energizing or deenergizing of the lockup control valve means.

11. A lockup control system according to claim 10 in which said second reference data corresponds to each of the speed stages other than the first speed stage and wherein said electronic control means executes the lockup control when the vehicle is running in a speed stage higher than said first speed stage.

12. A lockup control system according to claim 10 in which said first means includes a vehicle speed signal generator means connected to the output shaft of the transmission and digital data generator means for generating digital speed data in accordance with the output of the vehicle speed signal generator means.

13. A lockup control system according to claim 12 in which said second means is a throttle opening sensor connected to the throttle valve of the engine.

14. A lockup control system according to claim 13 in which said first and second reference data are in the form of the vehicle speed addressed by the form of the throttle opening.

15. A lockup control system according to claim 10 in which said electronic control means detects a virtual release of an acceleartor pedal and sets up the lockup control valve means in a manner corresponding to the termination of a lockup in response to the detection of the release of the accelerator pedal.

16. A lockup control system according to claim 15 in which said second means is a throttle opening sensor connected to the throttle valve of the engine and said electronic control means detects virtual release of the accelerator pedal by detecting substantially zero throttle opening.

17. A lockup control system according to claim 10 in which said electronic control means set up the solenoid valve means in a manner corresponding to the termination of a lockup immediately before a shift of the speed stage.

18. A lockup control system according to claim 17 in which said electronic control means maintains the termination of the lockup for a given time interval after the shift of a speed stage.

19. A lockup control system according to claim 18 in which said electronic control means initiates a shift operation at a time interval corresponding to the throttle opening after the termination of the lockup.

20. A lockup control system according to claim 18 in which said electronic control means initiates a shift operation with a time delay after the termination of the lockup which is equal to the sum of a time interval corresponding to the throttle opening and a time interval corresponding to a variation of the throttle opening.

21. A lockup control system according to claim 18 in which said electronic control means maintains the termination of the lockup for a given time interval after the shift operation.

22. A lockup control system according to claim 21 in which said given time interval has a length corresponding to the throttle opening.

23. A lockup control system according to claim 21 in which said given time interval is the sum of a first time interval corresponding to the throttle opening and a second time interval corresponding to a variation of the throttle opening.

24. A lockup control system for an automatic, variable speed transmission including a directly coupled clutch and a hydraulic circuit including fluid path switching means, speed stage control valve means and lockup control valve means comprising:

vehicle speed signal generator means connected to output shaft of the transmission;

digital data generator means for generating digital speed data in accordance with the output of said vehicle speed signal generator means;

throttle opening sensor means connected to the throttle valve of the engine to which the transmission is connected;

first solenoid driver means for selectively energizing or deenergizing the speed stage control valve means in response to a speed stage control signal;

second solenoid driver means for selectively energizing or deenergizing the lockup control valve means in response to a lockup control signal; and electronic control means including means for storing first reference data in the form of vehicle speed addressed by throttle opening and indicative of boundaries between speed stage regions as well as second reference data in the form of vehicle speed, addressed by the form of throttle opening and indicative of boundaries between regions where a lockup operation of the transmission is advantageous and regions where the lockup is advantageously terminated, said reference data being provided for a plurality of speed stages; means for reading the vehicle speed signal and the throttle opening signal; means for reading out data of said first reference data addressed by throttle opening signal, comparing vehicle speed with the read-out first reference data, and providing a speed stage control signal for energizing or deenergizing said speed stage control valve means as well as reading out data of said second reference data addressed by throttle opening, comparing vehicle speed with the read-out second reference data and providing a lockup control signal for energizing or deenergizing said lockup control valve means.

25. A lockup control system according to claim 24 in which said second reference data corresponds to each of the speed stages other than the first speed stage and wherein said electronic control means executes the lockup control when the vehicle is running in a speed stage higher than the first speed stage.

26. A lockup control system according to claim 25 in which said electronic control means detects a virtual release of an accelerator pedal and sets up the lockup control valve means in a manner corresponding to the termination of a lockup in response to the detection of the release of the accelerator pedal.

27. A lockup control system according to claim 26 in which said electronic control means detects virtual release of the acceleartor pedal by detecting a substantially zero throttle opening.

28. A lockup control system according to claim 25 in which said electronic control means sets up the lockup control valve means in a manner corresponding to the termination of a lockup immediately before a shift of the speed stage.

29. A lockup control system according to claim 28 in which said electronic control means maintains the termination of the lockup for a given time interval after the shift of the speed stage.

30. A lockup control system according to claim 29 in which the given time interval has a length corresponding to the throttle opening.

31. A lockup control system according to claim 29 in which the given time interval is the sum of a first time interval corresponding to a variation of the throttle opening.

32. A lockup control system according to claim 28 in which said electronic control means initiates a shift operation at a time interval corresponding to the throttle opening after the termination of the lockup.

33. A lockup control system according to claim 28 in which said electronic control means initiates a shift operation with a time delay after the termination of the lockup which is equal to the sum of a time interval corresponding to the throttle opening and a time interval corresponding to a variation of the throttle opening.

* * * * *